(12) United States Patent
Suzuki

(10) Patent No.: US 8,338,052 B2
(45) Date of Patent: Dec. 25, 2012

(54) METHOD FOR MANUFACTURING A MEMBRANE-ELECTRODE ASSEMBLY, WITH FOLDING PROCESS

(75) Inventor: Hiroshi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 238 days.

(21) Appl. No.: 12/744,114

(22) PCT Filed: Nov. 11, 2008

(86) PCT No.: PCT/IB2008/003027
§ 371 (c)(1),
(2), (4) Date: May 21, 2010

(87) PCT Pub. No.: WO2009/068949
PCT Pub. Date: Jun. 4, 2009

(65) Prior Publication Data
US 2010/0266927 A1    Oct. 21, 2010

(30) Foreign Application Priority Data

Nov. 26, 2007 (JP) ................................ 2007-304748
Mar. 26, 2008 (JP) ................................ 2008-079471

(51) Int. Cl.
*H01M 4/88* (2006.01)
(52) U.S. Cl. ......... 429/483; 429/507; 429/481; 429/435
(58) Field of Classification Search .................. 429/507, 429/481, 535, 483
See application file for complete search history.

(56) References Cited

FOREIGN PATENT DOCUMENTS

| EP | 1 139 472 A1 | 10/2001 |
|---|---|---|
| EP | 1 626 453 A2 | 2/2006 |
| JP | 62-278762 | 12/1987 |
| JP | 6-103992 | 4/1994 |
| JP | 6-111827 | 4/1994 |
| JP | 06338342 | 12/1994 |
| JP | 8-259710 | 10/1996 |

(Continued)

OTHER PUBLICATIONS

"Notification of Reason(s) for Refusal" in Japanese Patent Application No. 2008-079471, filed Mar. 26, 2008 (Drafting date: Dec. 15, 2009).

(Continued)

*Primary Examiner* — Barbara Gilliam
*Assistant Examiner* — Zachary Best
(74) *Attorney, Agent, or Firm* — Finnegan, Henderson, Farabow, Garrett & Dunner, LLP

(57) ABSTRACT

A method for manufacturing a composite electrolyte membrane including: a first folding process of folding a laminate (10A) obtained by laminating and integrating an electrolyte sheet (11) having an electrolyte as an electrolyte layer and a reinforcing sheet (12) having a porous polymer material as a reinforcing layer, so that a part of a surface of the laminate (10A) lies on another part of the surface; an impregnation process of impregnating the electrolyte of the folded laminate (10B) into the reinforcing layer; and a hydrolysis process of hydrolyzing the electrolyte impregnated in the laminate (10C).

6 Claims, 14 Drawing Sheets

FOREIGN PATENT DOCUMENTS

| | | |
|---|---|---|
| JP | 2001-118591 | 4/2001 |
| JP | 2003-3078 | 1/2003 |
| JP | 2003-132909 | 5/2003 |
| JP | 2004-164861 | 6/2004 |
| JP | 2004164861 A * | 6/2004 |
| JP | 2004-206915 | 7/2004 |
| JP | 2005-340689 | 12/2005 |
| JP | 2006-49002 | 2/2006 |
| JP | 2006-147257 | 6/2006 |
| JP | 2007-26915 | 2/2007 |
| JP | 2007-250265 | 9/2007 |
| JP | 2008-4344 | 1/2008 |
| WO | WO 2006/071225 A1 | 7/2006 |
| WO | WO 2007/072765 A1 | 6/2007 |
| WO | WO 2007072765 A1 * | 6/2007 |

OTHER PUBLICATIONS

Text of First Office Action for Chinese Appl. No. 200880117847.0 dated Jul. 18, 2012.

* cited by examiner

F I G . 12
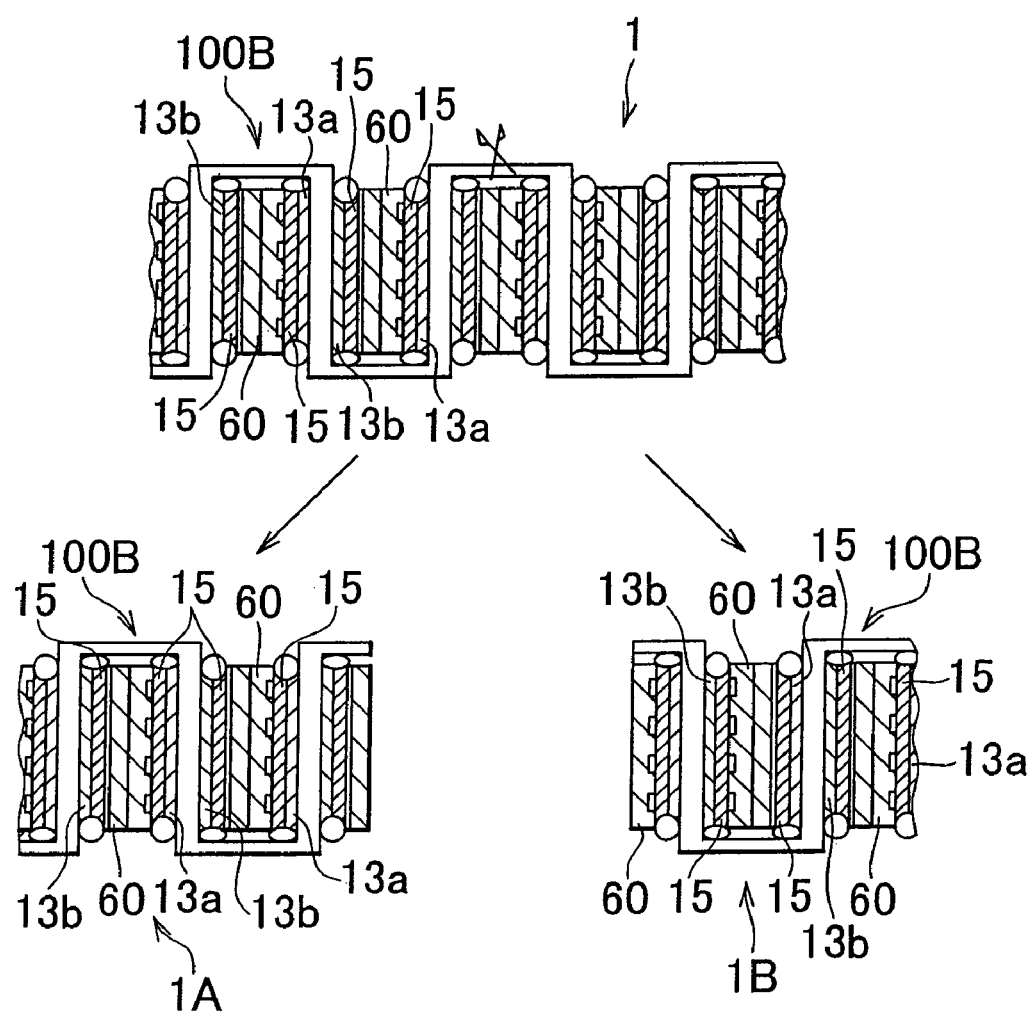

METHOD FOR MANUFACTURING A MEMBRANE-ELECTRODE ASSEMBLY, WITH FOLDING PROCESS

CROSS-REFERENCE TO RELATED APPLICATIONS

This application is a national phase application of International Application No. PCT/IB2008/003027, filed Nov. 11, 2008, and claims the priority of Japanese Application Nos. 2007-304748, filed Nov. 26, 2007 and 2008-079471, filed Mar. 26, 2008, the contents of all of which are incorporated herein by reference.

BACKGROUND OF THE INVENTION

1. Field of the Invention

The invention relates to a composite electrolyte membrane, membrane-electrode assembly, a fuel cell, and methods for manufacturing same, and more particularly to a composite electrolyte membrane having at least an electrolyte layer composed of an electrolyte and a reinforcing layer in which a porous polymer material is impregnated with the electrolyte, a membrane-electrode assembly, a fuel cell, and methods for manufacturing same.

2. Description of the Related Art

Solid polymer fuel cells using an electrolyte membrane have been studied for applications to movable bodies such as automobiles because such fuel cells may operate at a low temperature and have small size and weight. In particular, social interest in fuel cell automobiles having solid polymer fuel cells installed thereon as ecological cars has been growing.

As shown in FIG. 14, a solid polymer fuel cell has a membrane-electrode assembly (MEA) 95 as the main structural element. A single fuel cell 90, which is called a unit cell, is formed by sandwiching the membrane-electrode assembly between separators 96 having a fuel (hydrogen) gas flow channel and an air gas low channel. The membrane-electrode assembly 95 has a structure in which an anode-side electrode (anode catalyst layer) 93a is laminated on one side of an electrolyte membrane 91 that is an ion exchange membrane and a cathode-side electrode (cathode catalyst layer) 93b is laminated on the other side, and respective diffusion layers 94a, 94b are disposed at the anode catalyst layer 93a and cathode catalyst layer 93b.

In order to ensure the membrane strength, the electrolyte membrane 91 is provided with a reinforcing layer composed of a porous polymer material such as polytetrafluoroethylene (PTFE), and the reinforcing layer is impregnated with an electrolyte. Such a composite electrolyte membrane having a reinforcing layer is manufactured by a cast film forming method illustrated by FIG. 13A, which is disclosed in Japanese Patent Application Publication No. 2006-147257 (JP-A-2006-147257).

More specifically, first, an electrolyte including an electrolyte polymer and a solvent is coated on one side of a backing sheet 81 that is being transported, and the electrolyte is dried. Then, a reinforcing sheet 82 composed of a porous polymer material is disposed on the surface of the dried electrolyte layer. The electrolyte is impregnated from one surface of the reinforcing sheet 82 into the porous polymer materials at least by applying pressure to the electrolyte layer and reinforcing sheet 82 in this disposition state. Then, the electrolyte is coated on the other surface of the reinforcing sheet 82 and dried thereby making it possible to manufacture the composite electrolyte membrane 91 in which at least the reinforcing layer composed of the porous polymer material and the electrolyte impregnated in the reinforcing layer are provided on the backing sheet 81.

In the composite electrolyte membrane 91 manufactured in the above-described manner, as shown in FIG. 13B, for example, the anode catalyst layer 93a and cathode catalyst layer 93b that have been formed on the backing sheet 81 are transferred by using a tool and employing heating and pressure application, and catalyst layers 93a, 93b are further formed on the surface of the composite electrolyte membrane 91.

However, in the above-described cast film forming method, the electrolyte is impregnated in two surfaces of the reinforcing sheet in different processes. As a result, although the same electrolyte containing an electrolyte polymer and a solvent is used, a spread in film properties may occur between the two surface sides of the composite electrolyte membrane and uniform properties are difficult to obtain.

Further, because the manufacturing process includes coating the electrolyte on each surface and drying the solvent, an electrolyte membrane having a highly accurate uniform film thickness is sometimes difficult to obtain. In addition, the position of the reinforcing sheet with respect to the coated electrolyte may be displaced from the desired position correspondingly to the accuracy of the manufacturing apparatus. This displacement especially easily occurs in the arrangement of anode and cathode catalyst layers.

Thus, when uniform membrane properties are not obtained on both surfaces of the electrolyte membrane and when the thickness of the electrolyte membrane and positions of catalyst layers are not within the desired accuracy ranges, defective assembling may occur in the cell manufacturing process or a spread may occur in the fuel cell performance during power generation.

SUMMARY OF THE INVENTION

The invention provides a composite electrolyte membrane in which the uniformity of electrolyte properties within the membrane is improved and which may be manufactured with stable dimensional accuracy, and also provides a membrane-electrode assembly, a fuel cell, and methods for manufacturing same.

A method for manufacturing a composite electrolyte membrane according to the first aspect of the invention includes a first folding process of folding a laminate obtained by laminating and integrating an electrolyte sheet having an electrolyte as an electrolyte layer and a reinforcing sheet including a porous polymer material as a reinforcing layer, so that a part of a surface of the laminate lies on another part of the surface; an impregnation process of impregnating the electrolyte of the folded laminate into the reinforcing layer; and a hydrolysis process of hydrolyzing the electrolyte impregnated in the laminate.

Further, in the method for manufacturing a composite electrolyte membrane according to the first aspect, in the lamination process, the laminate may be formed by heating and laminating the electrolyte sheet and the reinforcing sheet.

Further, in the method for manufacturing a composite electrolyte membrane according to the first aspect, in the impregnation process, the folded laminate may be heated till the electrolyte is dissolved and the electrolyte may be impregnated in the reinforcing layer.

With the method for manufacturing a composite electrolyte membrane according to the above-described aspect, the laminate including the reinforcing layer and the electrolyte layer may be formed in the lamination process by integrating the electrolyte sheet with the reinforcing sheet by joining. A method for laminating the two sheets is not particularly limited, provided that the laminate is formed, and part of the electrolyte sheet may be impregnated in one surface of the reinforcing sheet by heating and pressurizing the electrolyte sheet.

Further, in the first folding process, the laminate is folded so that one part of a surface of the laminate lies on another, that is, parts of the surface on the reinforcing layer side at least lie on each other or parts of the surface on the electrolyte layer side at least lie on each other. In the process of folding the laminate, the surfaces that are brought into contact by folding may be joined by heating and pressure application. It is preferred that folding be performed about the central axis of the laminate, so that two equal surfaces lie on each other, but the number of folds and the folding method are not particularly limited, provided that the electrolytes on both surfaces of the electrolyte membrane are homogeneous after the below-described second folding process has been implemented.

In the impregnation process, the folded laminate is heated at least till the electrolyte is melted and the electrolyte is impregnated into the porous reinforcing layer. In the impregnation process, pressure application may be performed together with heating of the laminate. As a result, the electrolyte of a single electrolyte sheet employed at the lamination stage is disposed at both surfaces of the laminate. In the hydrolysis process, an ion exchange function may be imparted to the electrolyte by hydrolyzing the electrolyte impregnated in the laminate.

With such a method for manufacturing a composite electrolyte membrane, it is not necessary to position three sheets on both surfaces of the reinforcing sheet so as to sandwich the electrolyte sheet. Therefore, the positioning accuracy is increased and the electrolyte membrane quality is stabilized. Further, because the laminate is folded and the electrolyte of a single electrolyte sheet is impregnated, a homogeneous electrolyte may be disposed on both surfaces of the composite electrolyte membrane (electrolyte membrane). In addition, the electrolyte membrane thickness is also stabilized. Thus, the uniformity of electrolyte properties within the electrolyte membrane is improved, a highly accurate electrolyte membrane may be obtained, and fuel cell performance may be stabilized.

Further, the shape, thickness, etc., of the "electrolyte sheet" and "reinforcing sheet", as they are referred to in the description of the invention, are not particularly limited, provided that they may be folded after lamination, and the meaning thereof includes membranes, films, and the like. The "reinforcing sheet", as referred to herein, is a sheet composed of a porous polymer material that is employed with the object of reinforcing the electrolyte membrane, and the "reinforcing layer" is a layer having the porous polymer material and formed at least in the thickness direction of electrolyte membrane with the object of reinforcing the electrolyte membrane and the meaning thereof also includes a layer obtained by impregnating the polymer material with the electrolyte. Further, the "composite electrolyte membrane" means a layer including at least an electrolyte layer including an electrolyte and a reinforcing layer in which a porous polymer material is impregnated with the electrolyte.

In the method for manufacturing a composite electrolyte membrane according to the first aspect, in the first folding process, the laminate may be folded so that a part of a surface on the electrolyte layer side in the laminate lies on another part of the surface. According to the above-described aspect, because the laminate is folded in the first folding process so that a part of a surface on the electrolyte layer side in the laminate lies on another part of the surface and the reinforcing layer side becomes the electrolyte membrane surface, the reinforcing layer may be disposed in the impregnation process in a surface layer portion close to the surface in the thickness direction of the electrolyte membrane. As a result, the creep performance of the electrolyte membrane in the operation of the fuel cell may be improved.

In the method for manufacturing a composite electrolyte membrane according to the first aspect, in the first folding process, the laminate may be folded so that a part of a surface on the reinforcing layer side in the laminate lies on another part of the surface. According to the above-described aspect, because the laminate is folded in the first folding process so that a part of a surface on the reinforcing layer side in the laminate lies on another part of the surface and the electrolyte layer side becomes the electrolyte membrane surface, the electrolyte layer is formed in the surface layer in the thickness direction in the impregnation process and the position of the reinforcing layer is stabilized. As a result, in the fuel cell equipped with the electrolyte membrane, the electrolyte layer of the surface layer inhibits the spread in water movement within the surface of the electrolyte membrane during power generation. Moreover, adhesion of the electrolyte layer and catalyst layer may be improved and performance may be stabilized.

Any molten polymer may be used as the electrolyte (precursor polymer) according to the above-described embodiment, provided that it is not degraded by heat and may impart an ion exchange function after hydrolysis. Examples of polymers that may be advantageously used include perfluoro proton-exchange resins of fluoroalkyl copolymers having a fluoroalkyl ether side chain and a perfluoroalkyl main chain. Specific examples include Nafion (trade name, manufactured by Du Pont Co.), Aciplex (trade name, manufactured by Asahi Chemical Industry Co., Ltd.), Fremion (trade name, manufactured by Asahi Glass Co.), and Goaselect (trade name, manufactured by Japan Goatex Co., Ltd.). Other examples include partial fluororesins such as polymers of trifluorostyrenesulfonic acid and polymers obtained by introducing a sulfonic acid group in polyfluorovinylidene. Hydrocarbon proton-exchange resins in which a sulfonic acid group is introduced in styrene-divinyl benzene copolymer, polyimide resins, and the like may be also used. The polymers have to be appropriately selected according to the application or environment in which the fuel cell will be used, but perfrluoroseins are preferred from the standpoint of fuel cell life.

It is necessary that the reinforcing sheet does not dissolve during electrolyte impregnation. A reinforcing sheet including a water-repellent polymer is especially preferred. The reinforcing sheet including a water-repellent polymer is effective in preventing the supply of water that has condensed and accumulated in the solid polymer fuel cell to the electrode reaction products. Fluororesins such as polytetrafluoroethylene (PTFE), tetrafluoroethylene-hexafluoropropylene copolymer (FEP), and tetrafluoroethylene-perfluoroalkylvinyl ether copolymers (PFA) are especially preferred because they have high water-repellent ability. Fluorine-free films such as polyethylene terephthalate, polyethylene, polypropylene, and polyimides may be also used.

When the laminate is folded in the folding process, as described hereinabove, so that a part of a surface of the reinforcing layer side lies on another part of the surface in the method for manufacturing a composite electrolyte membrane according to the first aspect, in the lamination process, at least one of a radical inhibitor that decomposes hydrogen peroxide into water and oxygen and inhibits the generation of hydroxyl radicals and a water-retaining material may be disposed on the surface of the reinforcing layer after the laminate has been formed.

Further, when the laminate is folded in the folding process, as described hereinabove, so that a part of a surface of the reinforcing layer side lies on another part of the surface in the method for manufacturing a composite electrolyte membrane according to the first aspect, in the lamination process, at least one of a radical inhibitor that decomposes hydrogen peroxide into water and oxygen and inhibits the generation of hydroxyl radicals and a water-retaining material may be disposed between the electrolyte sheet and the reinforcing sheet.

According to the above-described aspect, at least one additive from among the radical inhibitor and water-retaining material is sandwiched in the first folding process and the additive is then added to the electrolyte in the center of the electrolyte membrane in the thickness direction in the impregnation process. Therefore, the additive may be fixed.

As a result, the additive is prevented from being moved or caused to flow out by the movement of water during power generation in the fuel cell. When a radical inhibitor is used, the radical inhibitor decomposes hydrogen peroxide produced as a byproduct during power generation in the fuel cell by the movement of water within the electrolyte membrane in the hydrolysis process into water and oxygen. As a result, the generation of hydroxyl radicals may be inhibited, the electrolyte membrane is stabilized, and degradation thereof may be inhibited. On the other hand, when a water-retaining material is disposed, the water retention and diffusion effects thereof may be obtained and the degradation of the fuel cell performance caused by the deterioration of proton conductivity may be effectively inhibited.

The radical inhibitor as referred to in the description of the invention is "a material for decomposing hydrogen peroxide produced as a byproduct during power generation in the fuel cell into water and oxygen and inhibiting the generation of hydroxyl radicals". Examples thereof include oxides of transition metals such as cerium, ruthenium, silver, tungsten, palladium, rhodium, zirconium, yttrium, manganese, molybdenum, lead, vanadium, and titanium. The water-retaining material is not particularly limited, provided that it may absorb water. Examples thereof include particles or fibers composed of water-absorbing polymer materials such as polystyrenesulfonic acid and cellulose and water-absorbing inorganic materials such as silica and titania.

Such radical inhibitors and water-retaining materials may be uniformly disposed on the surface of the reinforcing layer by a coating process such as die coating or spraying and a physical vapor deposition (PVD) process such as sputtering. Because the radical inhibitor and water-retaining material are sandwiched in the first folding process, as described hereinabove, the disposition method thereof is not particularly limited, provided that they may be sandwiched in the reinforcing layer to a degree such that they will not be separated during folding.

When finely powdered materials are used as the radical inhibitor and water-retaining material, the particle size of the finely powdered material is preferably larger than the pore size of the pores formed in the reinforcing sheet. With such a particle size, the powdered materials may be advantageously sandwiched in the first folding process.

A method for manufacturing a membrane-electrode assembly according to the second aspect of the invention includes the method for manufacturing a composite electrolyte membrane according to the first aspect, wherein in the lamination process, an anode catalyst layer and a cathode catalyst layer are disposed on a surface of the electrolyte layer after the laminate has been formed; and in the first folding process, the laminate is folded so that the anode catalyst layer is disposed on one surface of the laminate and the cathode catalyst layer is disposed on the other surface of the laminate.

With the method for manufacturing a membrane-electrode assembly according to the above-described object, because the anode catalyst layer and cathode catalyst layer are formed within the same surface where the electrolyte layer has been formed in the laminate obtained by the lamination process, these catalyst layers may be disposed accurately. As a result, where the accuracy of the laminate folding position in the first folding process is maintained, the distortion of the mutual arrangement of the anode catalyst layer and cathode catalyst layer may be inhibited. Further, the above-described diffusion layer may be disposed after the catalyst layers have been formed. By using the membrane-electrode assembly manufactured in the above-described manner, it is possible to prevent the occurrence of assembling defects when the membrane-electrode assembly is assembled in a fuel cell and inhibit the occurrence of spread in the fuel cell performance during power generation.

A method for manufacturing a membrane-electrode assembly according to the third aspect of the invention includes the method for manufacturing a composite electrolyte membrane according to the first aspect, wherein in the lamination process, a band-like laminate is formed and an anode catalyst layer and a cathode catalyst layer are disposed so that the anode catalyst layer and the cathode catalyst layer are formed along a transverse direction of the laminate on the surface of the electrolyte layer after the laminate has been formed; and in the first folding process, the laminate is folded in a longitudinal direction so that the anode catalyst layer is disposed on one surface of the laminate and the cathode catalyst layer is disposed on the other surface of the laminate.

In the method for manufacturing a membrane-electrode assembly according to the third aspect of the invention, in the lamination process, the anode catalyst layer and the cathode catalyst layer may be disposed so that a plurality of the anode catalyst layers and a plurality of the cathode catalyst layers are formed alternately in the longitudinal direction.

With the method for manufacturing a membrane-electrode assembly according to the above-described aspect, because the anode catalyst layer and cathode catalyst layer are formed along the transverse direction within the same surface where the electrolyte layer has been formed in the laminate obtained by the lamination process, these catalyst layers may be disposed accurately, without displacement, so as to sandwich the composite electrolyte membrane. As a result, where the accuracy of the laminate folding position in the first folding process is maintained, the distortion of the mutual arrangement of the anode catalyst layer and cathode catalyst layer may be inhibited, the occurrence of assembling defects when the membrane-electrode assembly is assembled in a fuel cell may be prevented, and the occurrence of spread in the fuel cell performance during power generation may be inhibited.

Further, because the folding process is implemented upon disposing the anode catalyst layer and the cathode catalyst layer so that a plurality of the anode catalyst layers and a plurality of the cathode catalyst layers are formed alternately in the longitudinal direction, a plurality of band-like membrane-electrode assemblies may be manufactured at the same time.

The method for manufacturing a membrane-electrode assembly according to the third aspect may further include a second folding process of folding the laminate along the transverse direction so that the anode catalyst layer and the cathode catalyst layer adjacent to the anode catalyst layer in the longitudinal direction face each other after the hydrolysis process.

In accordance with the invention, by performing the second forming process with respect to the band-like membrane-electrode assembly manufactured by the above-described manufacturing process, a single fuel cell in which the catalyst layer is formed without a displacement may be easily obtained from one membrane-electrode assembly, without stacking (laminating) a plurality of membrane-electrode assemblies, if the separator is disposed between the facing electrode layers.

Further, because a plurality of the anode catalyst layers and a plurality of the cathode catalyst layers are formed alternately in the longitudinal direction and, therefore, cathode catalyst layers are necessarily formed at the anode catalyst layers adjacent in the longitudinal direction, by performing the second folding process, it is possible to form a plurality of anode catalyst layers having surfaces in the same direction and to form a plurality of cathode catalyst layers having surfaces in the same direction that is opposite to that of the anode catalyst layers. As a result, the assembling error of the anode catalyst layer and cathode catalyst layer in the membrane-electrode assembly in the case of laminating a plurality of membrane-electrode assemblies by the typical procedure may be reliably prevented.

The method for manufacturing a fuel cell according to the fourth aspect of the invention is a method for manufacturing a fuel cell including the method for manufacturing a membrane-electrode assembly according to the third aspect and may include a diffusion layer and separator disposition process of disposing diffusion layers on a surface of the anode catalyst layer and a surface of the cathode catalyst layer of the membrane-electrode assembly after the second folding process, and disposing a separator having formed a fuel gas flow channel and an oxygen gas flow channel in the separator, so that the fuel gas flow channel is positioned on the anode catalyst layer side and the oxygen gas flow channel is positioned on the cathode catalyst layer side between the anode catalyst layer and the cathode catalyst layer that have the diffusion layers disposed thereon opposite each other.

With the method for manufacturing a fuel cell according to the above-described aspect, the separator may be disposed for insertion toward the flowing line in the transverse direction of the membrane-electrode assembly after the second folding process and a single fuel cell may be easily obtained. Thus, the number of production steps may be reduced by comparison with the typical method in which the separators are disposed between a plurality of membrane-electrode assemblies. In addition, the separators may be disposed in a continuous manner after the second folding process. Therefore, penetration of contaminants in the process of obtaining single fuel cells may be inhibited.

Further, when the diffusion layer and separator are disposed, disposing a separator having a diffusion layer formed on the surface thereof in the membrane-electrode assembly is preferred because the diffusion layer and separator may be disposed in the membrane-electrode assembly at the same time. However, this method is not limiting, and the diffusion layer and a separator may be disposed separately, provided that the diffusion layer and separator may be disposed in the membrane-electrode assembly and a fuel cell may be manufactured.

Further, the disposition of the catalyst layer may be performed by blowing the catalyst by spraying, and it is also possible to dispose a catalyst layer on a backing sheet and transfer the catalyst layer onto the electrolyte layer by using a tool or a coating die under heating and pressure application. Where a catalyst layer ionomer is used as the precursor polymer, the membrane-electrode assembly may be advantageously manufactured, without thermal degradation of the ionomer in the subsequent impregnation process. It is even more preferred that the electrolyte contained in the catalyst layer be a precursor of a fluorine-containing electrolyte.

Further, gas diffusion layers that are typically used in fuel calls may be used, without any specific limitation, as the diffusion layer. Examples of such gas diffusion layers include sheets of carbon fibers and porous electrically conductive sheets serving as a constituent material containing an electrically conductive substance as the main component. Electrically conductive particles such as carbon particles may be bonded to the sheets by using a hydrophobic resin as a binding material. Furthermore, the separator may be appropriately provided with a structure that, in addition to having the gas flow channel formed therein, discharges water that is produced during power generation and causes circulation of the cooling agent in order to inhibit heat generation in the fuel cell during power generation.

The composite electrolyte membrane according to the fifth aspect of the invention has at least an electrolyte layer including an electrolyte and a reinforcing sheet in which a porous polymer material is impregnated with the electrolyte, the composite electrolyte membrane including at least an addition layer in which at least one of a radical inhibitor that decomposes hydrogen peroxide into water and oxygen and inhibits the generation of hydroxyl radicals and a water-retaining material is added to the electrolyte; the reinforcing layers formed so as to sandwich the addition layer; and the electrolyte layers formed on the surface of each reinforcing layer.

The composite electrolyte membrane according to the sixth aspect of the invention has at least an electrolyte layer including an electrolyte and a reinforcing layer in which a porous polymer material is impregnated with the electrolyte, the composite electrolyte membrane including at least a first electrolyte layer as the electrolyte layer; addition layers which are formed so as to sandwich the first electrolyte layer, and in which at least one of a radical inhibitor that decomposes hydrogen peroxide into water and oxygen and inhibits the generation of hydroxyl radicals and a water-retaining material is added to the electrolyte; the reinforcing layers formed on the surfaces of the addition layers; and second electrolyte layers serving as the electrolyte layer and formed on the surfaces of the reinforcing layers.

With the composite electrolyte membrane according to the above-described aspect, by forming the addition layer having added thereto at least one additive from among a radial inhibitor and a water-retaining material, as described hereinabove, it is possible to inhibit the movement of these material and flow loss when the water moves during power generation in the fuel cell.

The composite electrolyte membrane according to the seventh aspect of the invention includes at least a pair of an anode catalyst layer and a cathode catalyst layer disposed on both surfaces of a composite electrolyte membrane in which a reinforcing sheet including a porous polymer material is impregnated with an electrolyte sheet including an electrolyte, so that the anode catalyst layer and the cathode catalyst layer sandwich the composite electrolyte membrane, wherein the membrane-electrode assembly is a band-like membrane electrode assembly, and a plurality of the anode catalyst layers and a plurality of the cathode catalyst layer are formed alternately in the longitudinal direction on the surface of the membrane-electrode assembly.

The composite electrolyte membrane according to the eighth aspect of the invention has at least a pair of an anode catalyst layer and a cathode catalyst layer disposed on both surfaces of the composite electrolyte membrane according to the fifth aspect, so as to sandwich the composite electrolyte membrane, wherein the membrane-electrode assembly is a band-like membrane electrode assembly, and the anode catalyst layers and the cathode catalyst layers are formed alternately in the longitudinal direction on the surface of the membrane-electrode assembly.

The composite electrolyte membrane according to the ninth aspect of the invention has at least a pair of an anode catalyst layer and a cathode catalyst layer disposed on both surfaces of the composite electrolyte membrane according to the sixth aspect, so as to sandwich the composite electrolyte membrane, wherein the membrane-electrode assembly is a band-like membrane electrode assembly, and the anode catalyst layers and the cathode catalyst layers are formed alternately in the longitudinal direction on the surface of the membrane-electrode assembly.

With the membrane-electrode assemblies of the above-described aspects, because a plurality of anode catalyst layers and a plurality of cathode catalyst layers are formed on the surface of the membrane-electrode assembly in the longitudinal direction, the membrane-electrode assembly may be folded in the transverse direction so that the anode catalyst layer and the cathode catalyst layer adjacent to the anode catalyst layer in the longitudinal direction face each other. The membrane-electrode assembly folded in the above-describe manner has formed therein a plurality of anode catalyst layers having the surface in the same direction and a plurality of cathode catalyst layers having the surface in the same direction opposite to the direction of the anode catalyst layers.

The membrane-electrode assembly according to the seventh to ninth aspects may be folded along the transverse direction so that the anode catalyst layer and the cathode catalyst layer adjacent to the anode catalyst layer in the longitudinal direction face each other.

The membrane-electrode assembly according to the above-described aspect has a structure having formed therein a plurality of anode catalyst layers having the surface in the same direction and a plurality of cathode catalyst layers having the surface in the same direction opposite to the direction of the anode catalyst layers. Therefore, by disposing a diffusion layer and a separator in the folded portion of the membrane-electrode assembly, it is possible to manufacture a fuel cell easily and without assembling defects of the membrane-electrode assembly that are typical for the related art.

The fuel cell according to the tenth aspect of the invention includes the membrane-electrode assembly according to the ninth aspect, the fuel cell including the membrane-electrode assembly; diffusion layers disposed on a surface of the anode catalyst layer and a surface of the cathode catalyst layer of the membrane-electrode assembly; and a separator having formed at least a fuel gas flow channel on the anode catalyst layer side and an oxygen gas flow channel on the cathode catalyst layer side in the separator, and disposed between the anode catalyst layer and the cathode catalyst layer that have the diffusion layers disposed thereon opposite each other. According to this aspect, the desired number of fuel cells may be obtained by cutting the portions folded in the longitudinal directions of the membrane-electrode assembly (portions of the electrolyte membrane that connect individual fuel cells).

According to the invention, a composite electrolyte membrane of stable dimensional accuracy in which the uniformity of electrolyte properties within the membrane is improved may be obtained. Furthermore, it is possible to obtain a membrane-electrode assembly in which the anode catalyst layer and cathode catalyst layer are formed so as to form, without displacement, the composite electrolyte membrane. In addition, the desired number of fuel cells having no contaminants may be easily obtained.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 12 illustrates a method for manufacturing a fuel cell with a desired number of unit cells from the fuel cell manufactured by the method illustrated by FIG. 11;

DETAILED DESCRIPTION OF EMBODIMENTS

Specific embodiments of the invention will be described below with reference to the appended drawings.

Figure 1:
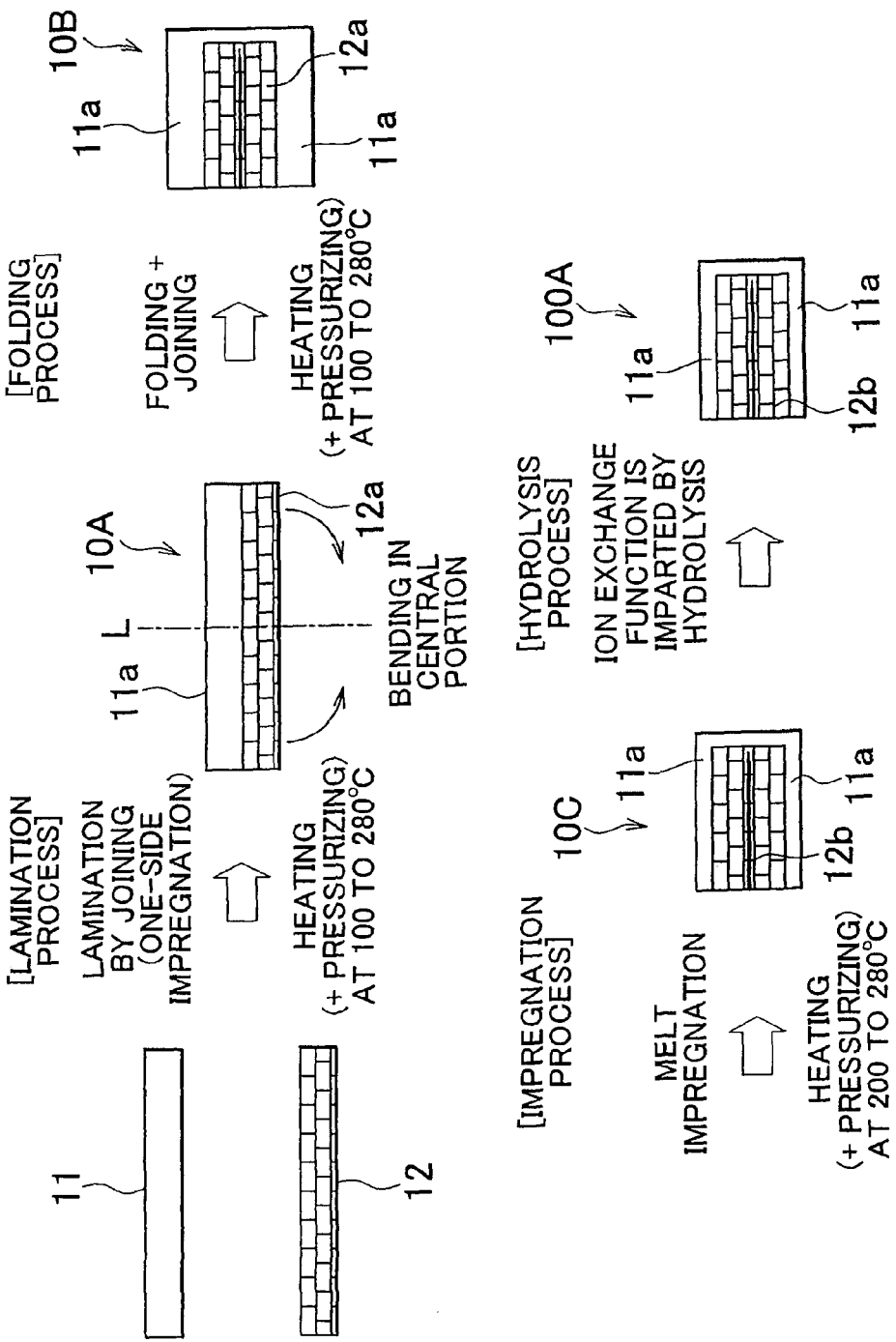
FIG. 1 is a schematic diagram illustrating a method for manufacturing a composite electrolyte membrane of a first embodiment of the invention.
Figure 2:
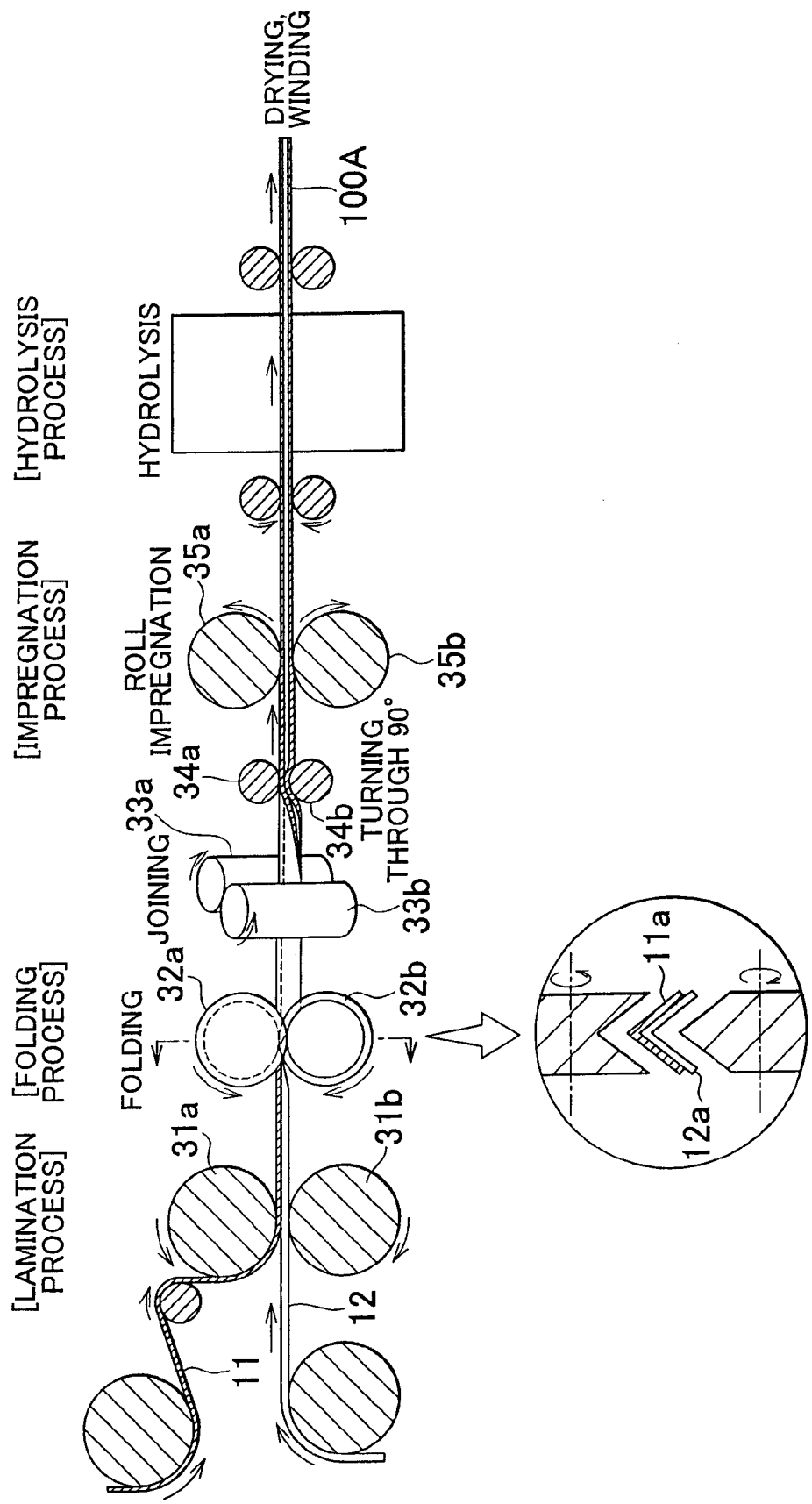
FIG. 2 is a schematic diagram of a manufacturing apparatus for implementing the manufacturing method illustrated by FIG. 1.

FIG. 1 is a schematic diagram illustrating a method for manufacturing a composite electrolyte membrane (electrolyte membrane) of the first embodiment, and FIG. 2 is a schematic diagram of a manufacturing apparatus for implementing the manufacturing method illustrated by FIG. 1.

As shown in FIG. 1 and FIG. 2, first, a sheet 11 composed of a band-like electrolyte (electrolyte sheet) and a band-like reinforcing sheet 12 composed of polytetrafluoroethylene (PTFE) that is a porous polymer material are prepared and a lamination process is implemented. More specifically, in the lamination process, the electrolyte sheet 11 and reinforcing sheet 12 are heated and laminated and a laminate 10A is produced in which the electrolyte sheet serves as an electrolyte layer 11a and the reinforcing sheet 12 serves as a reinforcing layer 12a.

The method for laminating the two sheets may be implemented by pasting or impregnating. More specifically, as shown in FIG. 2, for example, by heating and pressing the electrolyte sheet 11 and reinforcing sheet 12 together between a pair of rollers 31a, 31b, it is possible to impregnate part of the electrolyte sheet into one surface of the reinforcing sheet 12. The temperature of heating performed in this process is preferably within a range of 100 to 280° C. As a result, the electrolyte sheet 11 and reinforcing sheet 12 may be integrated. A molten electrolyte may be used instead of the electrolyte sheet 11.

The laminate 10A manufactured in the lamination process is then subjected to folding. More specifically, the laminate 10A is folded in the central portion along a central line L of the laminate 10A so that one part of a front surface of the laminate 10A on the side of the reinforcing layer 12a (reinforcing layer surface) lies on another part of the front surface, thereby producing a laminate 10B.

More specifically, as shown in FIG. 2, the laminate 10A may be folded in the center of the laminate 10A in the transverse direction thereof by rollers 32a, 32b provided with V-shaped convexities and concavities and rotating along the conveying direction (MD direction) of the laminate 10A. The laminate 10A deformed into the V-like shape by using the rollers 33a, 33b is then further folded so that one part of the reinforcing layer 12a of the laminate 10A lies on another, and the surfaces of the reinforcing layer 12a are joined by heating and pressurizing with the rollers 33a, 33b. The temperature at which the laminate 10A is heated in this process is preferably within a range of 100 to 280° C.

The laminate 10B manufactured in the folding process is then turned through 90° by the rollers 34a, 34b, and the laminate 10B is impregnated. More specifically, the laminate 10B is heated and pressurized till the electrolyte melts, and the electrolyte is impregnated in the reinforcing layer 12a to produce a laminate 10C.

More specifically, as shown in FIG. 2, the electrolyte of the electrolyte layer 11a on the surface of the laminate 10B may be impregnated into the pores of the porous reinforcing layer 12a and a reinforcing layer 12b impregnated with the electrolyte may be obtained with the heating and pressurizing rollers 35a, 35b rotating along the conveying direction of the laminate 10B. The temperature at which the laminate 10B is heated in this process is preferably within a range of 200 to 280° C.

The laminate 10C manufactured in the impregnation process may be subjected to hydrolysis, an ion exchange function may be imparted to the laminate 10C and a composite electrolyte membrane 100A may be obtained. As shown in FIG. 2, after the hydrolysis process, the composite electrolyte membrane 100A may be dried and the sheet-like composite electrolyte membrane 100A may be wound by a winding device (not shown in the figure).

The composite electrolyte membrane 100A thus obtained is manufactured only from two sheets: the electrolyte sheet 11 and the reinforcing sheet 12. Therefore, the sheets may be easily aligned and the quality of electrolyte membrane is stabilized. Further, the laminate 10A may be folded and the electrolyte of one electrolyte sheet 11 may be impregnated. As a result, the homogeneous electrolyte constituting the same electrolyte sheet 11 is disposed at both surfaces of the composite electrolyte membrane 100A and the electrolyte membrane thickness is also stabilized. Thus, it is possible to improve the uniformity of electrolyte properties within the electrolyte membrane, obtain a highly accurate electrolyte membrane, and stabilize the performance of fuel cell.

Further, the folding process is so performed that one part of the surface on the side of the reinforcing layer 12a (reinforcing layer surface) lies on another, and the surface on the side of the electrolyte layer 11a (electrolyte surface) becomes the front surface of the laminate 10B. Therefore, in the impregnation process, the electrolyte layer 11a is formed in the surface layer in the thickness direction, and the position of the reinforcing layer 12a is stabilized. As a result, in the fuel cell equipped with the electrolyte membrane 100A, the spread in water movement within the surface of the electrolyte membrane 100A during powder generation is inhibited by the electrolyte layer 11a of the surface layer. Moreover, the adhesion of the electrolyte membrane 100A and a catalyst layer (not shown in the figure) may be improved and fuel cell performance may be stabilized.

Further, where the composite electrolyte membrane 100A is manufactured by the manufacturing method shown in FIG. 2, the lamination process may be performed only by joining the two members and the operations from the lamination process to the hydrolysis process may be implemented as a continuous procedure. Therefore, the process may be simplified, quality control may be facilitated, and productivity may be increased.

Figure 3:
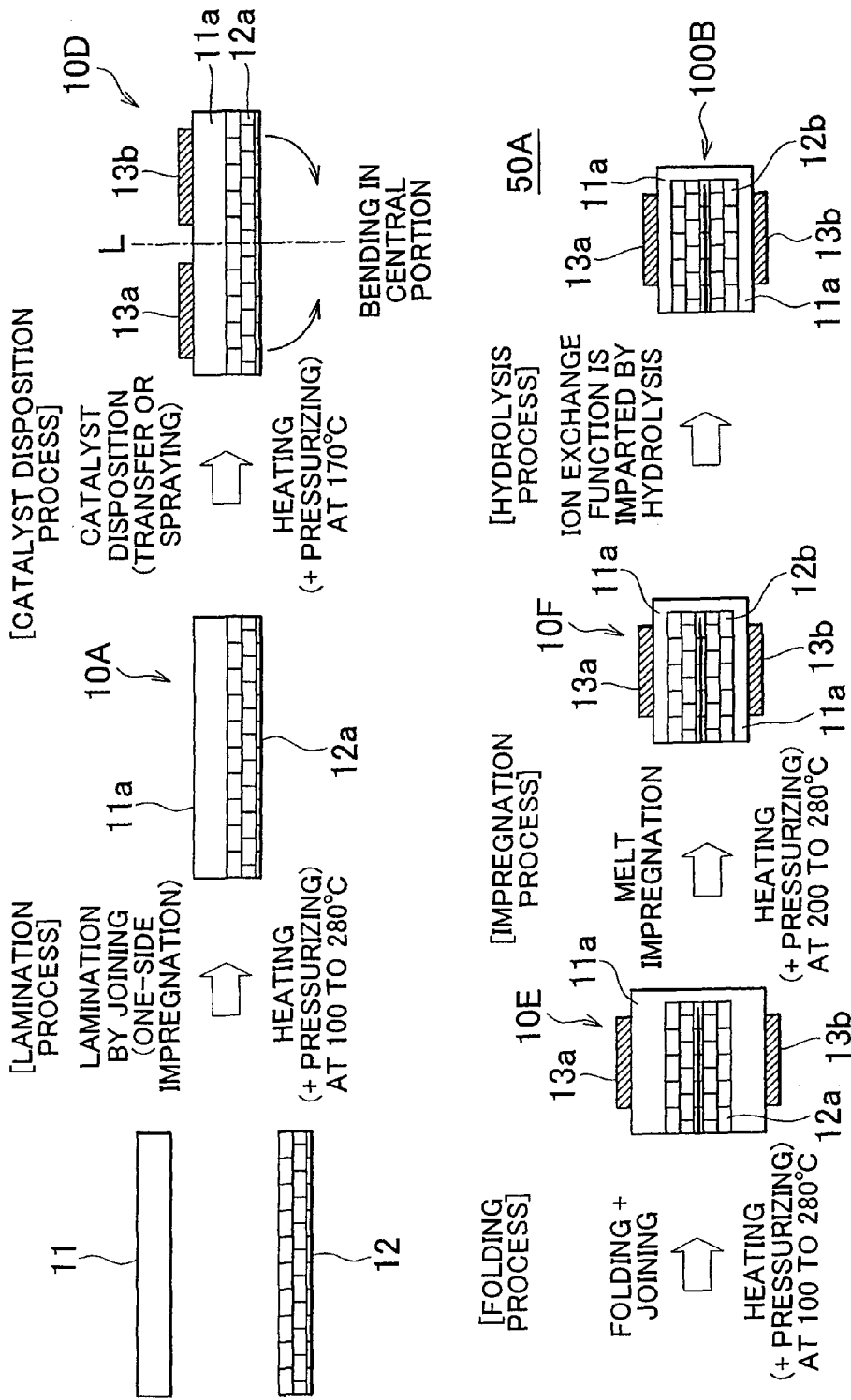
FIG. 3 is a schematic diagram illustrating a method for manufacturing a composite electrolyte membrane of a second embodiment of the invention.

FIG. 3 shows a second embodiment of the method for manufacturing the composite electrolyte membrane in accordance with the invention. This embodiment differs from the first embodiment illustrated by FIG. 1 in that catalyst layers 13a, 13b are disposed. FIG. 3 illustrates the process till the catalyst layers of a membrane-electrode assembly (MEA) 50A are formed. The manufacturing method of the second embodiment includes the above-described lamination process, folding process, impregnation process, and hydrolysis process, and these processes are assigned with the same reference numerals and the detailed explanation thereof is omitted.

As shown in FIG. 3, in the lamination process, an electrolyte sheet 11 and a reinforcing sheet 12 are joined and laminated and a laminate 10A composed of an electrolyte layer 11a and a reinforcing layer 12a is manufactured. An anode catalyst layer 13a and a cathode catalyst layer 13b are then disposed on the surface of the electrolyte layer 11a after the laminate 10A has been formed, and a laminate 10D having the catalyst layers 13a, 13b formed thereon is manufactured.

More specifically, in the catalyst disposition process, the catalyst layers 13a, 13b may be disposed by blowing the catalyst with a sprayer or the catalyst layers may be disposed on a backing sheet and then the catalyst layers may be transferred on the electrolyte layer by heating and pressurizing using a tool or a coating die. The advantage of using a catalyst layer ionomer as a precursor polymer is that ionomer thermal degradation of the ionomer in the subsequent impregnation process is prevented.

Then, in the folding process, the laminate 10D is folded so that the anode catalyst layer 13a is disposed on one surface of a laminate 10E, and the cathode catalyst layer 13b is disposed on the other surface of the laminate 10E. In the subsequent impregnation process, the electrolyte is impregnated in the reinforcing layer 12a and a laminate 10F is manufactured. In the hydrolysis process, an ion exchange function is imparted to the electrolyte of the laminate 10F, and a membrane-electrode assembly 50A including a composite electrolyte membrane 100B may be obtained.

With the above-described method for manufacturing the composite electrolyte membrane 100B and membrane-electrode assembly 50A, the anode catalyst layer 13a and cathode catalyst layer 13b are formed within the same surface of the laminate 10A obtained in the lamination process where the electrolyte layer 11a has been formed. Therefore, the catalyst layers 13a, 13b may be accurately positioned. As a result, where the accuracy of folding position of the laminate 10D in the folding process may be maintained, it is possible to inhibit the displacement of the anode catalyst layer 13a and cathode catalyst layer 13b.

By using the membrane-electrode assembly 50A including the electrolyte membrane 100B manufactured in the above-described manner in a fuel cell, it is possible to prevent the assembling defects occurring when the membrane is assembled as a unit cell of the fuel cell and to inhibit the spread in fuel cell performance during power generation. In particular because the electrolyte layer 11a of the surface layer is formed with good stability, the adhesion of the electrolyte layer 11a and catalyst layers 13a, 13b may be improved.

Figure 4:
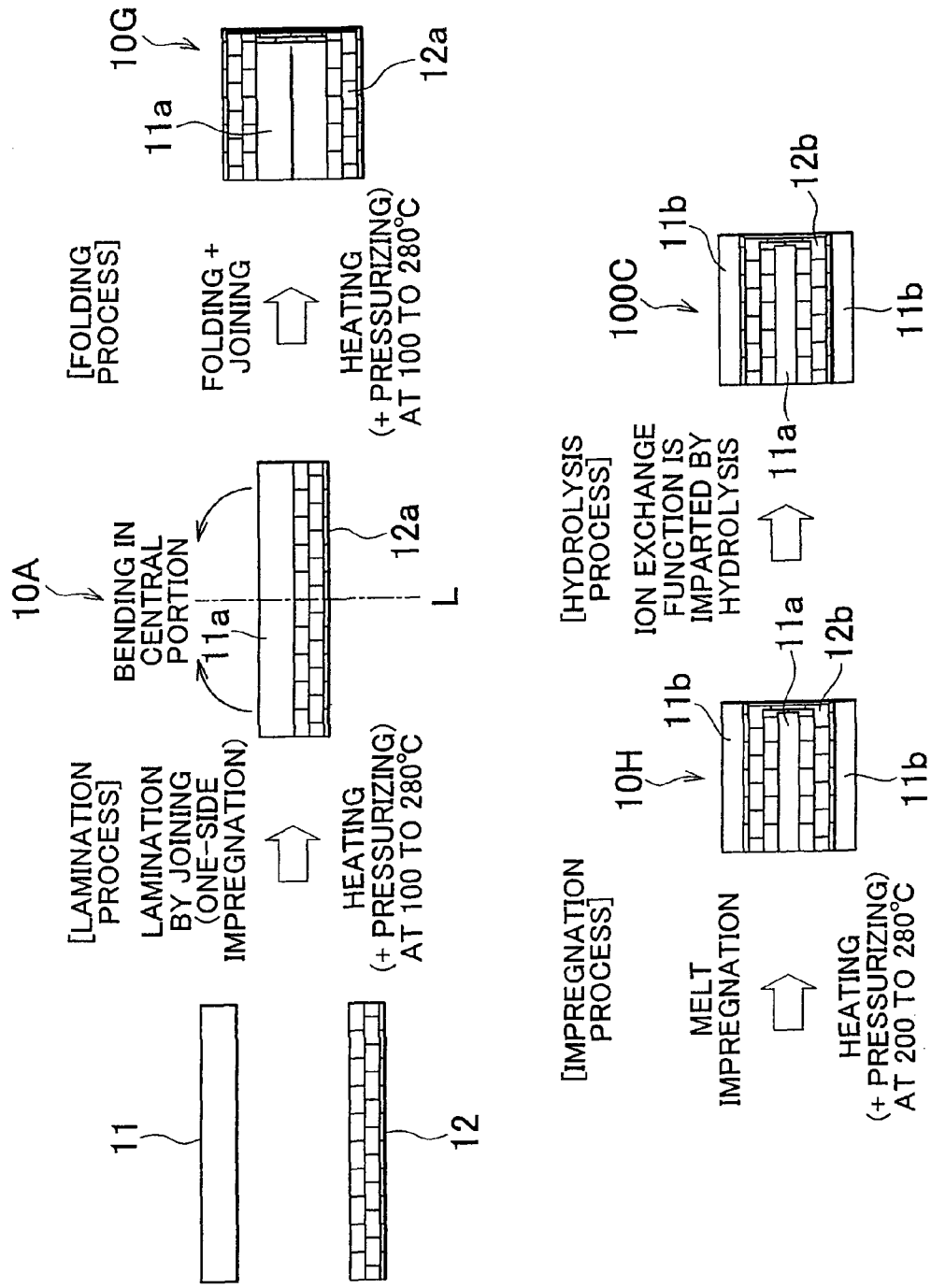
FIG. 4 is a schematic diagram illustrating a method for manufacturing a composite electrolyte membrane of a third embodiment of the invention.

FIG. 4 illustrates a third embodiment of the method for manufacturing a composite electrolyte membrane in accordance with the invention. The manufacturing method of the third embodiment differs from that of the first embodiment illustrated by FIG. 1 in that the folding direction in the folding process is different. The manufacturing method of the third embodiment includes the above-described lamination process, impregnation process, and hydrolysis process, and these processes are assigned with the same reference numerals and the detailed explanation thereof is omitted.

As shown in FIG. 4, in the lamination process, an electrolyte sheet 11 and a reinforcing sheet 12 are joined and laminated and a laminate 10A composed of an electrolyte layer 11a and a reinforcing layer 12a is manufactured. The laminate 10A manufactured in the lamination process is then subjected to a folding process. More specifically, the laminate 10A is folded in the central portion along a central line L of the laminate 10A so that one part of a front surface of the laminate 10A on the side of the electrolyte layer 11a (electrolyte layer surface) lies on another part of the front surface, thereby producing a laminate 10G.

Then, in the impregnation process, the electrolyte is impregnated in the reinforcing layer 12a and a laminate 10H is manufactured. In the hydrolysis process, an ion exchange function is imparted to the electrolyte of the laminate 10H and a composite electrolyte membrane 100C may be obtained.

With the above-described method for manufacturing the composite electrolyte membrane 100C, the laminate 10A is folded in the following process so that one part of the surface of the electrolyte layer 11a lies on another and the reinforcing layer 12a becomes the surface of the electrolyte membrane. Therefore, an electrolyte layer 11b is formed in the center of the composite electrolyte membrane 100C in the thickness direction, and a reinforcing layer 12b impregnated with the electrolyte may be disposed in the surface layer portion close to the surface of the electrolyte membrane in the thickness direction. As a result, creep performance of the electrolyte membrane 100C in the fuel cell operation process may be improved.

Figure 5:
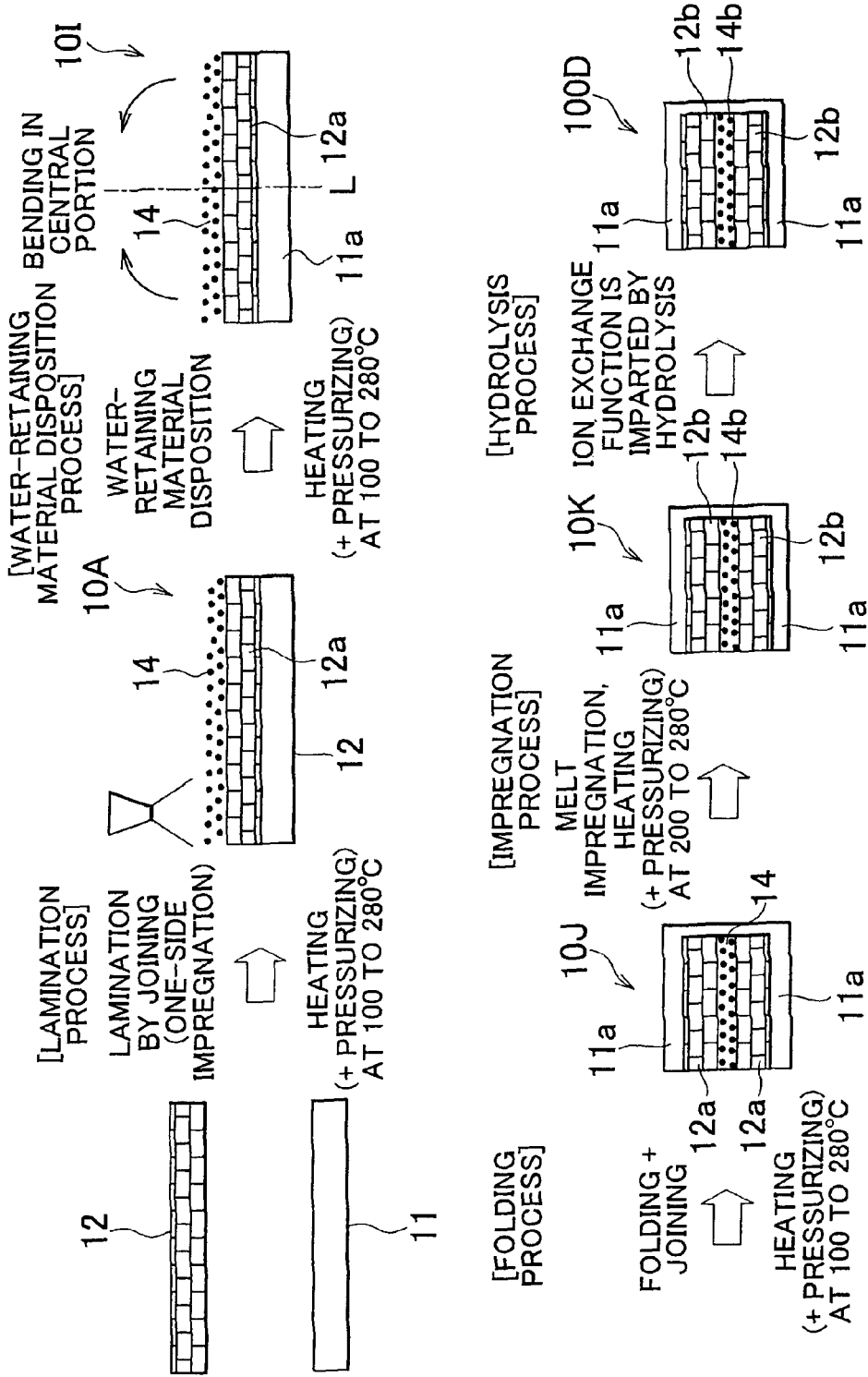
FIG. 5 is a schematic diagram illustrating a method for manufacturing a composite electrolyte membrane of a fourth embodiment of the invention.
Figure 6:
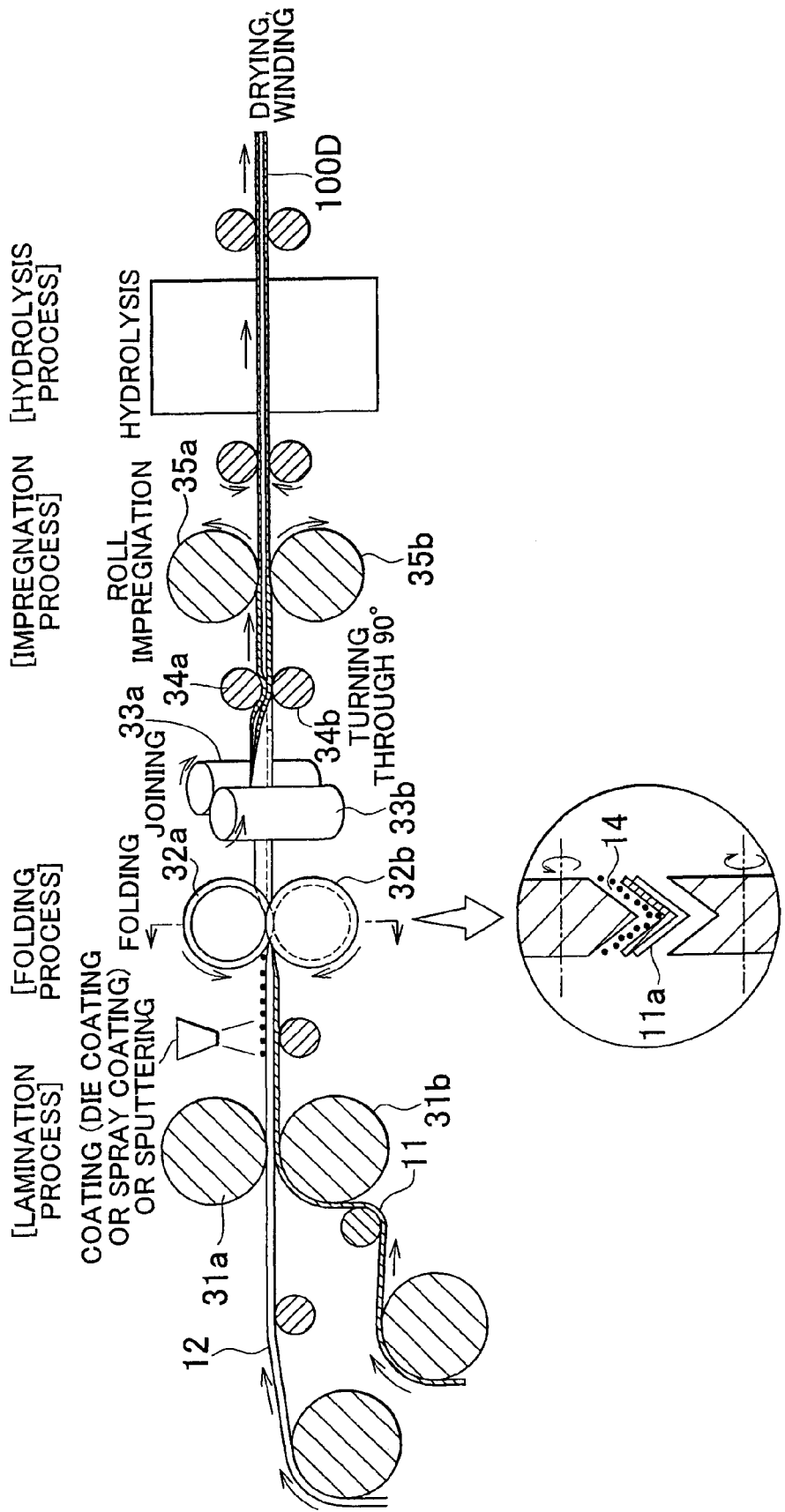
FIG. 6 is a schematic diagram of a manufacturing apparatus for implementing the manufacturing method illustrated by FIG. 5.

FIG. 5 illustrates the fourth embodiment of the method for manufacturing the composite electrolyte membrane in accordance with the invention. FIG. 6 is a schematic diagram of a manufacturing apparatus for implementing the manufacturing method shown in FIG. 5. The manufacturing method of the fourth embodiment differs from that of the first embodiment in that a water-retaining material is disposed after the lamination process. The manufacturing method of the fourth embodiment includes the above-described lamination process, impregnation process, and hydrolysis process, and these processes are assigned with the same reference numerals and the detailed explanation thereof is omitted.

As shown in FIG. 5, in the lamination process, an electrolyte sheet 11 and a reinforcing sheet 12 are joined and laminated and a laminate 10A composed of an electrolyte layer 11a and a reinforcing layer 12a is manufactured. In the subsequent water-retaining material disposition process, a water-retaining material 14 is disposed on the surface of the reinforcing layer 12a after the laminate 10A has been formed. More specifically, as shown in FIG. 6, the water-retaining material 14 is coated by a coating process such as die coating or spraying, or by sputtering on the surface of the reinforcing layer 12a so that the water-retaining material is uniformly disposed thereon. Thus, because the water-retaining material is sandwiched between the reinforcing layers in the below-described folding process, it is preferred that the water-retaining material be strongly bonded so as to prevent it from being separated during folding. When a finely powdered material is used as the water-retaining material, because it is sandwiched, as mentioned above, during folding, it is preferred that the particle size of the water-retaining material be larger than the diameter of pores formed in the reinforcing sheet.

Then, in the folding process, the water-retaining material 14 is sandwiched between the reinforcing layers 12a so that one part of the surface on the reinforcing layer side lies on another, a laminate 10I is folded, and a laminate 10J is manufactured. In the impregnation process, the electrolyte of the electrolyte layer 11a is impregnated in the water-retaining material 14 and reinforcing layer 12a, and a laminate 10K is manufactured. In the hydrolysis process, the electrolyte of the laminate 10K is hydrolyzed to impart an ion exchange function thereto and a composite electrolyte membrane 100D is obtained.

Thus, as shown in FIG. 5, a composite electrolyte membrane 100D may be obtained that includes at least an addition layer 14b in which the water-retaining material 14 is added as an additive to the electrolyte, reinforcing layers 12b formed to sandwich the addition layer 14b and impregnated with the electrolyte, and electrolyte layers 11a formed on the surface of the reinforcing layers 12b, the aforementioned layers being stacked in the thickness direction of the membrane.

In the composite electrolyte membrane 100D manufactured in the above-described manner, the water-retaining material 14 is sandwiched as an additive during folding, thereby making impossible to fix the water-retaining material in the center of the electrolyte membrane 100D in the thickness direction. As a result, the water-retaining material 14 may be prevented from moving under the effect of water movement and flow loss may be inhibited during power generation by the fuel cell. As a consequence, stable proton conductivity may be ensured.

Figure 7:
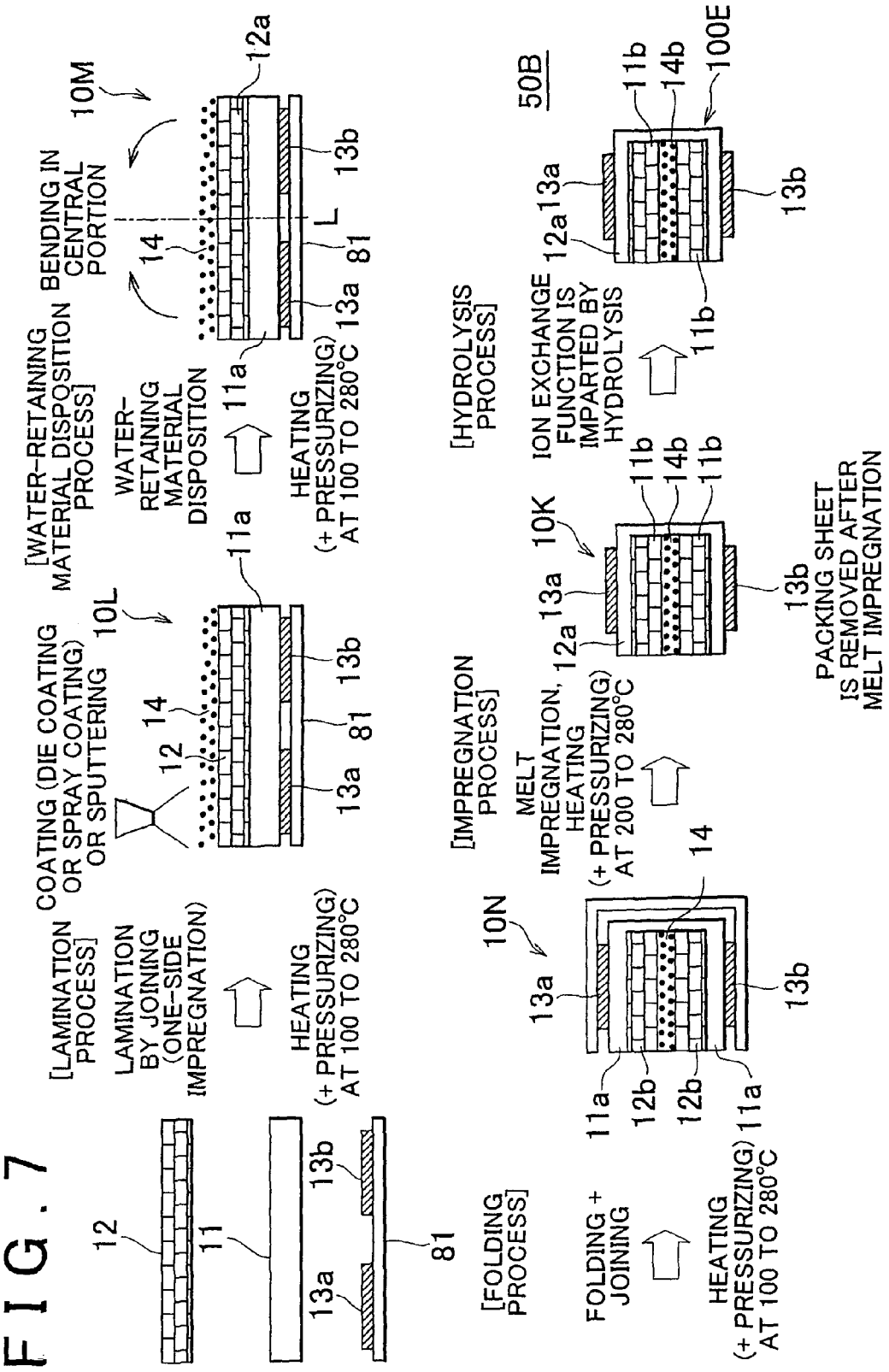
FIG. 7 is a schematic diagram illustrating a method for manufacturing a composite electrolyte membrane of a fifth embodiment of the invention.

FIG. 7 illustrates the fifth embodiment of the method for manufacturing the composite electrolyte membrane in accordance with the invention. The manufacturing method of the fifth embodiment differs from that of the fourth by the presence of a catalyst layer in the lamination process. The manufacturing method of the fifth embodiment includes the above-described impregnation process, folding process, and hydrolysis process, and these processes are assigned with the same reference numerals and the detailed explanation thereof is omitted.

As shown in FIG. 7, in the lamination process, an electrolyte sheet 11 and a reinforcing sheet 12 are joined and laminated. At the same time, an anode catalyst layer 13a and a cathode catalyst layer 13b disposed on a backing sheet 81 are disposed from the surface on the other side of the electrolyte sheet 11 and a laminate 10L is manufactured.

Then, a membrane-electrode assembly 50B including a composite electrolyte membrane 100E may be obtained via the water-retaining material disposition process, folding process, impregnation process, and hydrolysis process. In this case, the backing sheet 81 is removed from the laminate 10K after the impregnation process, an ion exchange function is imparted to the electrolyte of the laminate 10K after the hydrolysis process, and the membrane-electrode assembly 50B including the composite electrolyte membrane 100E may be obtained.

Thus, similarly to the second embodiment, the displacement of the anode catalyst layer 13a and cathode catalyst layer 13b may be inhibited, assembling defects of the unit cell of a fuel cell may be prevented, and the occurrence of spread in the fuel cell performance during power generation may be inhibited. In the composite electrolyte membrane 100E manufactured in the above-described manner, the water-retaining material is fixed in the center of the electrolyte membrane 100E in the thickness direction. As a result, the water-retaining material 14 may be prevented from moving under the effect of water movement and flow loss may be inhibited during power generation by the fuel cell. As a consequence, stable proton conductivity may be ensured.

Figure 8:
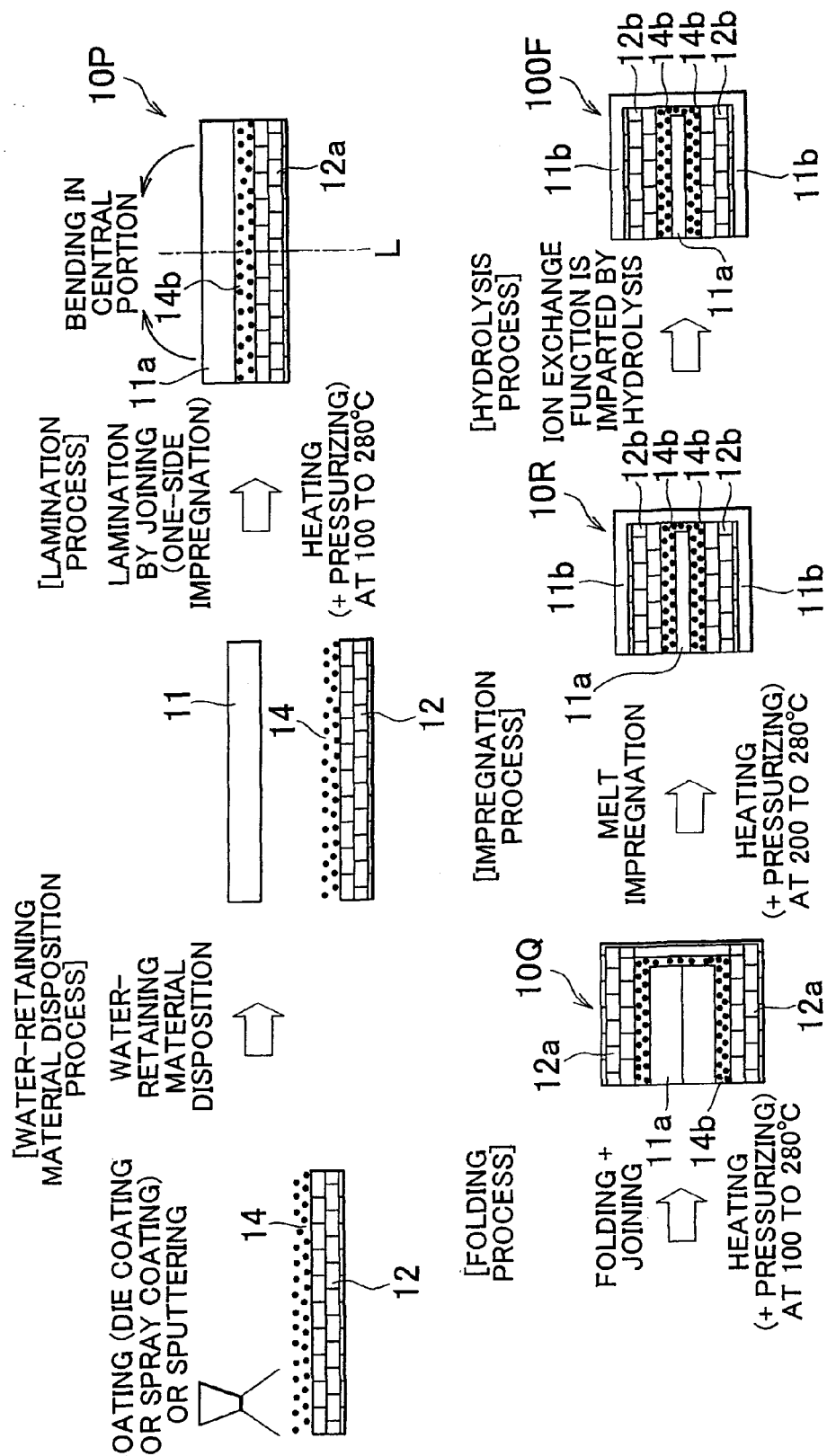
FIG. 8 is a schematic diagram illustrating a method for manufacturing a composite electrolyte membrane of a sixth embodiment of the invention.

FIG. 8 illustrates the sixth embodiment of the method for manufacturing the composite electrolyte membrane in accordance with the invention. The manufacturing method of the sixth embodiment differs from that of the fourth embodiment in that a water-retaining material is disposed prior to the lamination process. The manufacturing method of the sixth embodiment includes the above-described impregnation process, folding process, and hydrolysis process, and these processes are assigned with the same reference numerals and the detailed explanation thereof is omitted.

As shown in FIG. 8, in the lamination process, first, a water-retaining material 14 is disposed. The disposition method is identical to that of the above-described embodiment. Then, in the lamination process, an electrolyte sheet 11 and a reinforcing sheet 12 are disposed so that the water-retaining material 14 is disposed between the electrolyte sheet 11 and reinforcing sheet 12. Because the joining is performed by impregnating the electrolyte of the electrolyte sheet 11 from one side of the reinforcing sheet 12, an addition layer 14b in which the water-retaining material 14 is added as an additive to the electrolyte is formed between the electrolyte layer 11a and reinforcing layer 12a in the laminate 10P after the joining. A composite electrolyte membrane 100F is then obtained via the folding process, impregnation process, and hydrolysis process.

Thus, as shown in FIG. 8, a composite electrolyte membrane 100F may be obtained that includes at least the first electrolyte layer 11a as an electrolyte layer, addition layers 14b in which the water-retaining material is added as an additive to the electrolyte and which sandwich the first electrolyte layer 11a, reinforcing layers 12b formed to sandwich the addition layers 14b and impregnated with the electrolyte, and second electrolyte layers 11b formed on the surface of the reinforcing layers 12b, the aforementioned layers being stacked in the thickness direction of the membrane.

In the composite electrolyte membrane 100F obtained in the above-described manner, the laminate 10A is folded so that one part of the surface of the electrolyte layer 11a lies on another and the reinforcing layer 12a becomes the surface of the electrolyte membrane. Therefore, the electrolyte layer 11a is formed in the center of the composite electrolyte membrane 100F in the thickness direction, the reinforcing layers 12b impregnated with the electrolyte are disposed in the surface layer portion close to the surface of the electrolyte membrane in the thickness direction, and the addition layers may be disposed in the vicinity thereof. As a result, not only the creep performance of the electrolyte membrane 100F in the fuel cell operation process may be improved, but the water-retaining ability of the electrolyte membrane 100F may be further improved.

Figure 9:
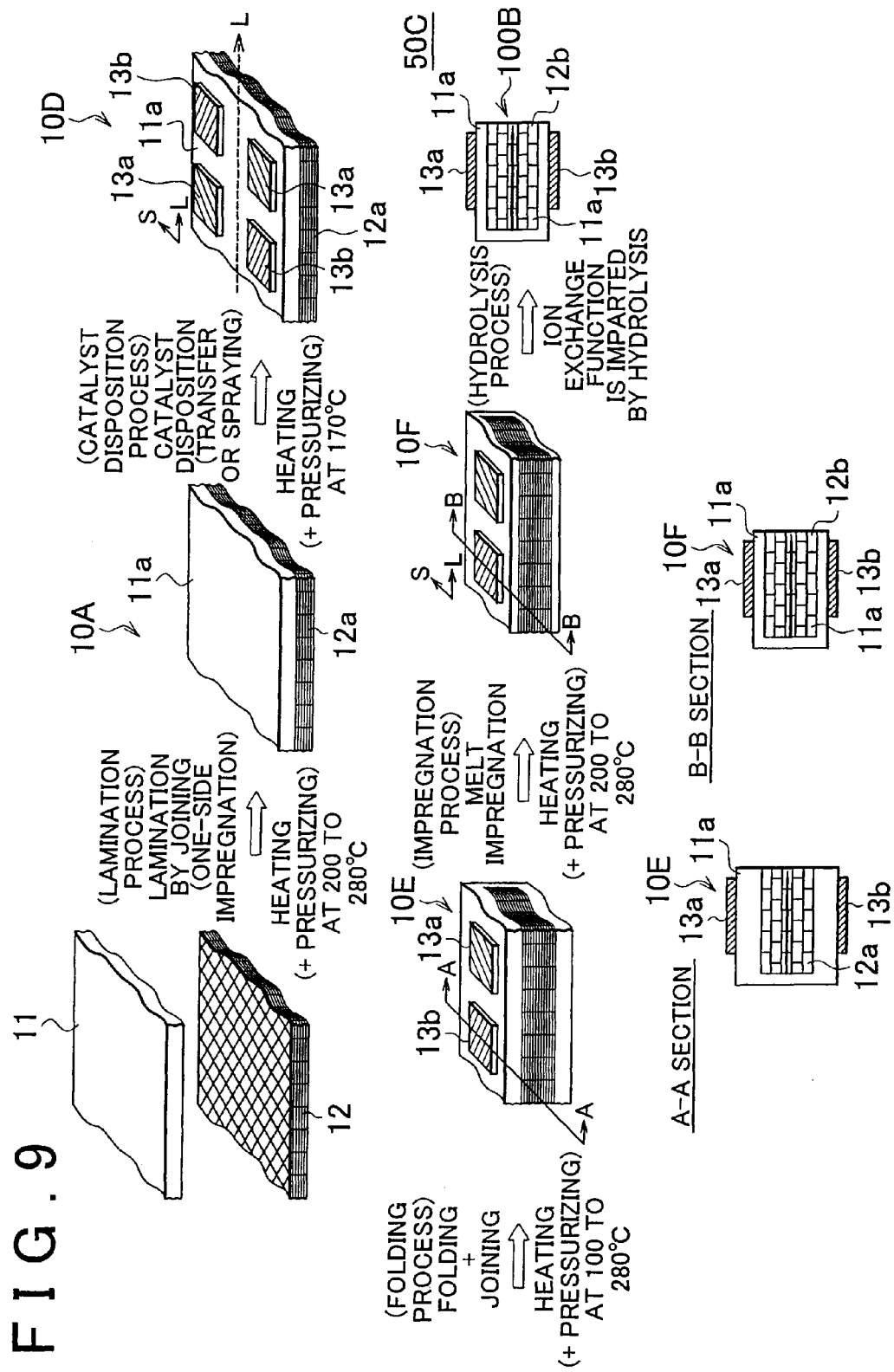
FIG. 9 is a schematic diagram illustrating a method for manufacturing a membrane-electrode assembly of an embodiment of the invention.

FIG. 9 is a schematic diagram illustrating the method for manufacturing a membrane-electrode assembly of an embodiment of the invention, this diagram serving to explain the second folding process applied to the membrane-electrode assembly shown in FIG. 9. As shown in FIG. 9, a sheet (electrolyte sheet) 11 composed of a band-like electrolyte and a band-like reinforcing sheet 12 composed of polytetrafluoroethylene (PTFE) that is a porous polymer material are prepared. Then, in the lamination process, the electrolyte sheet 11 and reinforcing sheet 12 are heated, pressurized, and laminated and a laminate 10A is produced in which the electrolyte sheet serves as an electrolyte layer 11a and the reinforcing sheet 12 serves as a reinforcing layer 12a.

An anode catalyst layer 13a and a cathode catalyst layer 13b are then disposed on the surface of the electrolyte layer 11a after the laminate 10A has been formed, and a laminate 10D having the catalyst layers 13a, 13b formed thereon is manufactured.

More specially, in the catalyst disposition process, two rows of anode catalyst layers 13a and cathode catalyst layers 13b are formed along the transverse direction S of the laminate 10A on the surface of the electrolyte layer 11a after the laminate 10A has been formed. Further, the anode catalyst layer 13a and cathode catalyst layer 13b are also disposed along the longitudinal direction (conveying direction) L so that a plurality of anode catalyst layers 13a and a plurality of cathode catalyst layers 13b are formed alternately (in other words, so that the two rows of anode catalyst layers 13a and cathode catalyst layers 13b are formed diagonally), and these layers are fixed by pressurizing and also heating at a temperature equal to or lower than 170° C.

In the same manner as in the second embodiment, the disposition of the catalyst layers 13a, 13b may be performed by using blowing with a sprayer, by employing a backing sheet, or by using transfer with a tool or coating die, and the disposition method is not particularly limited, provided that a plurality of catalyst layers 13a, 13b may be disposed in the above-described arrangement on the desired surface of the electrolyte layer 11a.

Then, in the folding process, the laminate 10D is folded in the central portion of the laminate 10D, in the same manner as in the above-described several embodiments, along the longitudinal direction L so that the anode catalyst layer 13a is disposed on one surface of the laminate 10E and the cathode catalyst layer 13b is disposed on the other surface of the laminate 10E (the anode catalyst layer 13a and cathode catalyst layer 13b are disposed so as to sandwich the laminate 10E (composite electrolyte membrane)). Then, in the impregnation process, the electrolyte is impregnated in the reinforcing layer 12a and a laminate 10F is manufactured. In the hydrolysis process, an ion exchange function is imparted to the electrolyte of the laminate 10F and a membrane-electrode assembly 50C including a composite electrolyte membrane 100B may be obtained.

Because the anode catalyst layer 13a and cathode catalyst layer 13b are formed along the transverse direction S in the same surface in which the electrolyte layer 11a of the laminate after the lamination process has been formed, these catalyst layers 13a, 13b may be accurately disposed without displacement so as to sandwich the composite electrolyte membrane 100B. As a result, where the folding position accuracy of the laminate 10E is maintained in the folding process, the displacement of mutual arrangement of the anode catalyst layer 13a and cathode catalyst layer 13b may be inhibited, the assembling defects occurring in the below-described assembling in a fuel cell 1 may prevented, and the spread in performance during power generation of the fuel cell 1 may be inhibited.

The membrane-electrode assembly 50C is a band-shaped membrane-electrode assembly, and because a plurality of anode catalyst layers 13a and a plurality of cathode catalyst layers 13b are formed alternately along the longitudinal direction on the surface of the membrane-electrode assembly 50C, a fuel cell may be easily manufactured by below-described second folding process.

Figure 10:
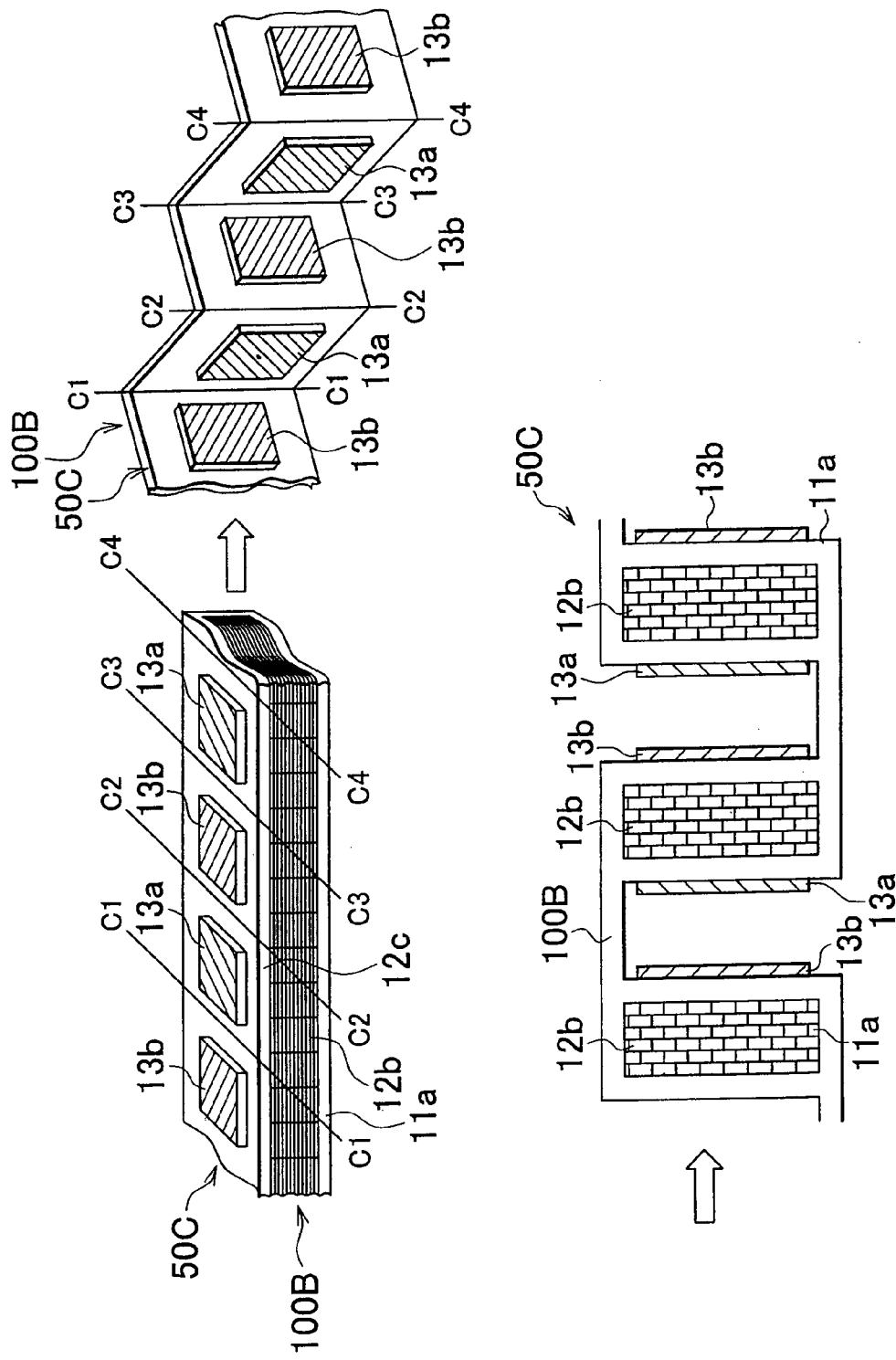
FIG. 10 illustrates the second folding of the membrane-electrode assembly shown in FIG. 9.

The membrane-electrode assembly 50C is then subjected to second folding. More specifically, as shown in FIG. 10, in the second folding process performed after the hydrolysis process, the membrane-electrode assembly 50C is folded along the transverse direction S (along C1-C1, C2-C2, . . . in the figure) so that the anode catalyst layer 13a and the cathode catalyst layer 13b adjacent to the anode catalyst layer 13a in the longitudinal direction L face each other.

Such folding may be performed, for example, by preparing a folding tool having a thickness enabling the introduction of the below-described separator, pressing a distal end of the folding tool along the transverse direction S, and folding, but the folding method is not particularly limited provided that the folding may be so performed that the catalyst layers 13a, 13b adjacent in the longitudinal direction L face each other.

Where the second folding process is performed in the above-described manner, if the below-described separator or the like is disposed between these opposing catalyst layers 13a, 13b, single cells of the fuel cell in which the catalyst layers 13a, 13b are formed without displacement may be easily produced from one continuous membrane-electrode assembly 50C, without laminating a plurality of membrane-electrode assemblies.

Further, because a plurality of anode catalyst layers 13a and a plurality of cathode catalyst layers 13b are formed alternately along the longitudinal direction L, and the cathode catalyst layer 13b is always formed in the layer adjacent to the anode catalyst layer 13a in the longitudinal direction L, the second folding process forms a plurality of anode catalyst layers 13a having surfaces in the same direction (surfaces that are in contact with a diffusion layer 15) and forms a plurality of cathode catalyst layers 13b having surfaces in the same direction (surfaces that are in contact with a diffusion layer 15) opposite to the aforementioned direction. As a result, errors in the assembling of anode catalyst layers and cathode catalyst layers of a membrane-electrode assembly that may occur in laminating a plurality of membrane-electrode assemblies by a typical method may be prevented.

Figure 11:
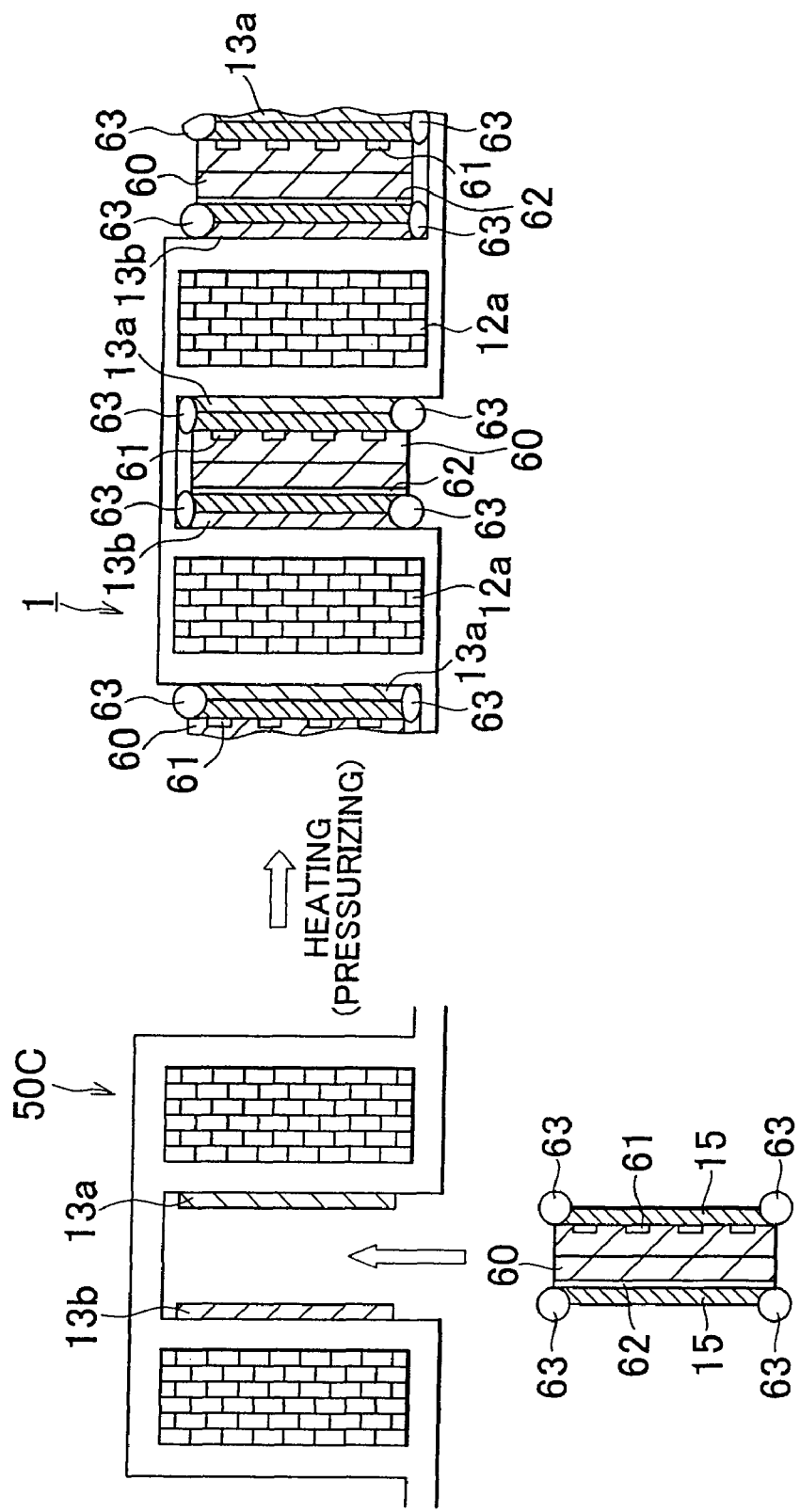
FIG. 11 illustrates a method for manufacturing a fuel cell from the membrane-electrode assembly shown in FIG. 10.
Figure 13A:
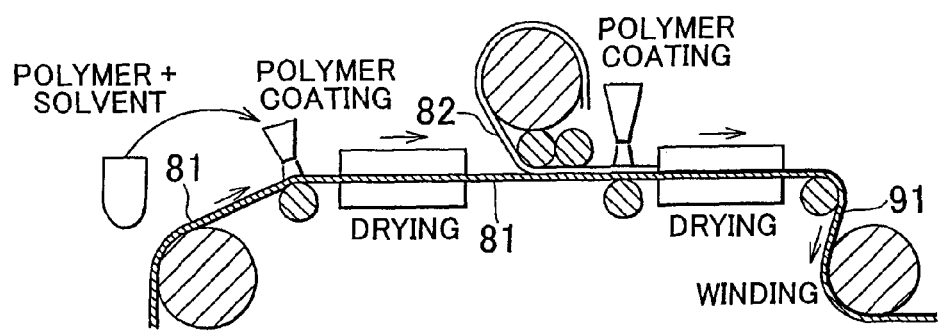
FIG. 13A illustrates a method for manufacturing a composite electrolyte membrane by a cast film forming method in the method for manufacturing a composite electrolyte membrane according to the related art.
Figure 13B:
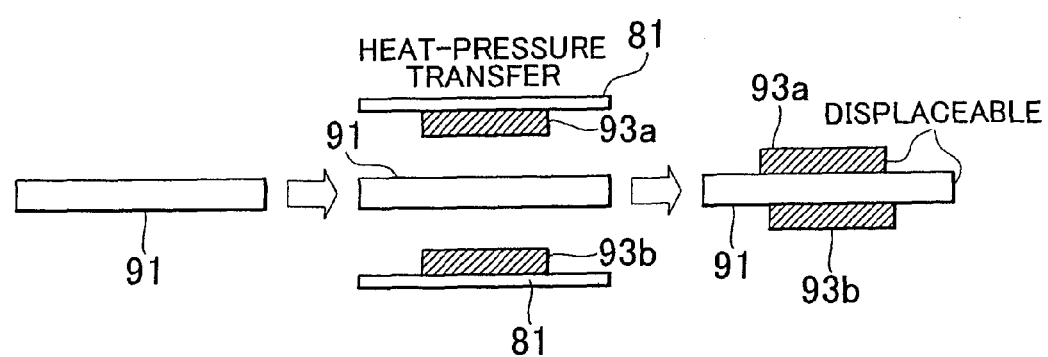
FIG. 13B illustrates a method for forming a catalyst layer on a composite electrolyte membrane by a transfer process in the method for manufacturing a composite electrolyte membrane according to the related art.

A method for manufacturing a fuel cell by using the membrane-electrode assembly manufactured in the above-described manner will be described below. FIG. 11 illustrates a method for manufacturing a fuel cell from the membrane-electrode assembly 50C shown in FIG. 10.

In the present embodiment, the method for manufacturing a fuel cell includes a process of disposing a diffusion layer 15 on the surface of the anode catalyst layer 13a and cathode catalyst layer 13b of the membrane-electrode assembly 50C after the second folding process and then disposing a separator 60 having formed therein a fuel gas flow channel 61 and an oxygen gas flow channel 62 between the anode catalyst layer 13a and the cathode catalyst layer 13b that have the diffusion layers disposed thereon opposite each other.

More specifically, the separator 60 having formed therein the fuel gas flow channel 61 and the oxygen gas flow channel 62 is prepared. Then, the diffusion layer 15 for disposition on the surface of the anode catalyst layer 13a and cathode catalyst layer 13b is disposed on both surfaces of the separator 60. A member 63 capable of sealing the membrane-electrode assembly 50C and adhering thereto is then attached to both ends of the separator 60 in the longitudinal direction.

The separator 60 having the diffusion layer 15 and sealing agent 63 attached thereto is inserted toward the folding portion of the membrane-electrode assembly 50C so that the diffusion layers 15 are positioned on the anode catalyst layer 13a and cathode catalyst layer 13b of the membrane-electrode assembly 50C. As a result, laminated electrodes are formed by sandwiching the diffusion layers 15 and separator 60 on the upper surface of the opposing catalyst layers 13a, 13b of the membrane-electrode assembly 50C, and subsequent heating and pressurizing in the thickness direction produces the fuel cell 1 in which a plurality of unit cells are stacked.

With the above-described process, the number of operations may be reduced in comparison with the typical method in which separators are disposed between a plurality of membrane-electrode assemblies, and because the separator may be disposed in a continuous manner after the second folding process, the penetration of contaminants in the process of forming unit cells of the fuel cell 1 may be inhibited.

FIG. 12 illustrates a method for manufacturing a fuel cell including the desired number of unit cells from the fuel cell manufactured by the manufacturing method shown in FIG. 11. As shown in FIG. 12, in the fuel cell 1 manufactured by the manufacturing method shown in FIG. 11, fuel cells composed of a plurality of unit cells are connected by electrolyte membranes in an insulated state. Therefore, as shown in FIG. 11, fuel cells 1A, 1b composed of a necessary number of unit cells may be obtained in a modular state (from several unit cells to several hundreds unit cells) by cutting the electrolyte membrane in the connection portions, without assembling errors in the mutual arrangement of orientations (anode/cathode surface orientations) produced during cell lamination.

The embodiments of the composite electrolyte membrane, membrane-electrode assembly, and fuel cell in accordance with the invention and methods for manufacturing same are described above, but the invention is not limited to these embodiments, and various design modifications may be made without departing from the essence of the invention described in the appended claims.

For example, in the fourth to sixth embodiments, a water-retaining material is used as the additive, but a radical inhibitor composed of an oxide of a transition metal such as cerium may be also used to decompose hydrogen peroxide generated as a byproduct during power generation in the fuel cell into water and oxygen and inhibit the occurrence of hydroxyl radicals.

Further, in the composite electrolyte membranes manufactured in the first to sixth embodiments, the folding end portion serving as a folding allowance formed in the folding process may be cut off with a slitter or the like.

Figure 14:
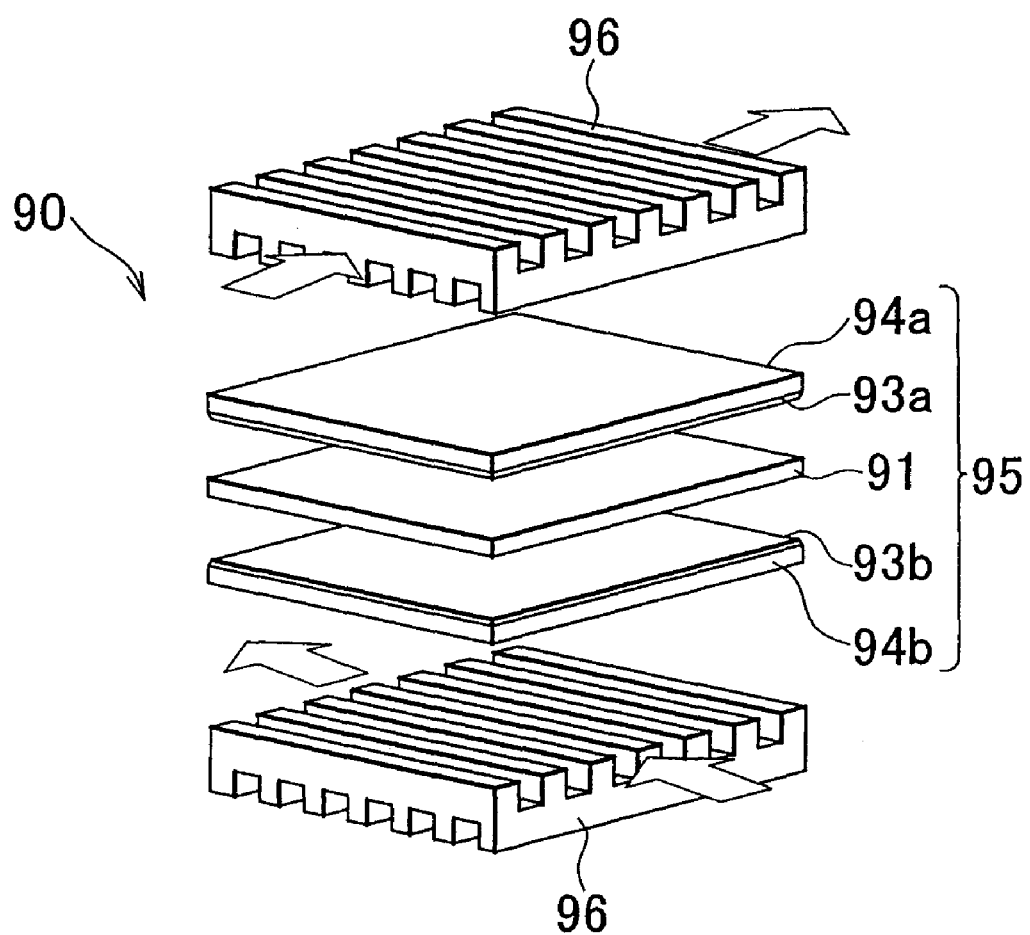
FIG. 14 is a schematic diagram illustrating an example of a solid polymer fuel cell (single cell) to the related art.

In the second to fifth embodiments, catalyst layers are additionally disposed, but it goes without saying that a fuel cell may be obtained by additionally disposing a diffusion layer and a separator shown in FIG. 14 at the catalyst layers.

Further, in the embodiment shown in FIG. 11, the separator having a diffusion layer formed on the surface thereof is disposed in the membrane-electrode assembly by inserting in the folded portion of the membrane-electrode assembly when the diffusion layer and separator are disposed, but this method is not limiting, and the diffusion layer and separator may be disposed separately, provided that the diffusion layer and separator may be disposed in the membrane-electrode assembly and a fuel cell may be manufactured. Further, in the present embodiment, the catalyst layers are disposed after the lamination process, but the anode catalyst layer and cathode catalyst layer may be further disposed on the diffusion layer disposed on the separator, without disposing the catalyst layers on the electrolyte membrane, provided that the anode catalyst layer and cathode catalyst layer may be disposed accurately.

Furthermore, in the embodiment shown in FIGS. 9 to 12, an additive such as a water-retaining agent and a radical inhibitor is not disposed in the composite electrolyte membrane, but with the method described in the fourth to sixth embodiments illustrated by FIGS. 5, 7, and 8, an additive such as a water-retaining agent and a radical inhibitor may be disposed in the composite electrolyte membrane.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A method for manufacturing a membrane-electrode assembly, including a method for manufacturing a composite electrolyte membrane, said method for manufacturing a composite electrolyte membrane comprising:
   a lamination process of obtaining a laminate by laminating and integrating an electrolyte sheet including an electrolyte as an electrolyte layer and a reinforcing sheet including a porous polymer material as a reinforcing layer;
   a first folding process of folding the laminate obtained by the lamination process, so that one part of a surface of the laminate lies on another part of the surface;
   an impregnation process of impregnating the electrolyte of the folded laminate into the reinforcing layer; and
   a hydrolysis process of hydrolyzing the electrolyte impregnated in the laminate;
   wherein
   in the first folding process, the laminate is folded so that a part of a surface on the reinforcing layer side in the laminate lies on another part of the surface;
   in the lamination process, a band-like laminate is formed and an anode catalyst layer and a cathode catalyst layer are disposed so that the anode catalyst layer and the cathode catalyst layer are formed along a transverse direction of the laminate on the surface of the electrolyte layer after the laminate has been formed;
   in the first folding process, the laminate is folded along a longitudinal direction so that the anode catalyst layer is disposed on one surface of the laminate and the cathode catalyst layer is disposed on the other surface of the laminate;
   in the lamination process, the anode catalyst layer and the cathode catalyst layer are disposed so that a plurality of the anode catalyst layers and a plurality of the cathode catalyst layers are formed alternately in the longitudinal direction; and
   said method for manufacturing a membrane-electrode assembly further comprising a second folding process of folding the laminate along the transverse direction so that the anode catalyst layer and the cathode catalyst layer adjacent to the anode catalyst layer in the longitudinal direction face each other after the hydrolysis process.

2. The method for manufacturing a membrane-electrode assembly according to claim 1, wherein in the lamination process, the laminate is formed by heating and laminating the electrolyte sheet and the reinforcing sheet.

3. The method for manufacturing a membrane-electrode assembly according to claim 1, wherein in the impregnation process, the folded laminate is heated until the electrolyte is dissolved and the electrolyte is impregnated in the reinforcing layer.

4. The method for manufacturing a membrane-electrode assembly according to claim 1, wherein in the lamination process, at least one of a radical inhibitor that decomposes hydrogen peroxide into water and oxygen and inhibits generation of hydroxyl radicals and a water-retaining material is disposed on a surface of the reinforcing layer after the laminate has been formed.

5. The method for manufacturing a membrane-electrode assembly according to claim 1, wherein in the lamination process, at least one of a radical inhibitor that decomposes hydrogen peroxide into water and oxygen and inhibits generation of hydroxyl radicals and a water-retaining material is disposed between the electrolyte sheet and the reinforcing sheet.

6. A method for manufacturing a fuel cell, including the method for manufacturing a membrane-electrode assembly according to claim 1, further comprising a diffusion layer and separator disposition process of disposing diffusion layers on a surface of the anode catalyst layer and a surface of the cathode catalyst layer of the membrane-electrode assembly after the second folding process, and disposing a separator having formed a fuel gas flow channel and an oxygen gas flow channel in the separator, so that the fuel gas flow channel is positioned on the anode catalyst layer side and the oxygen gas flow channel is positioned on the cathode catalyst layer side between the anode catalyst layer and the cathode catalyst layer that have the diffusion layers disposed thereon opposite each other.

* * * * *